US012774012B2

(12) United States Patent
Tam et al.

(10) Patent No.: US 12,774,012 B2
(45) Date of Patent: Oct. 27, 2026

(54) EVIDENCE GRID FOR VEHICLE NAVIGATION

(71) Applicant: Nissan North America, Inc., Franklin, TN (US)

(72) Inventors: Qizhan Tam, San Jose, CA (US); Manh Huynh, Sunnyvale, CA (US); Huiching Chen, San Jose, CA (US); Drew Steeves, San Lorenzo, CA (US); Derek Lau, San Francisco, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 72 days.

(21) Appl. No.: 18/791,064

(22) Filed: Jul. 31, 2024

(65) Prior Publication Data

US 2026/0035016 A1 Feb. 5, 2026

(51) Int. Cl.
*B60W 60/00* (2020.01)
*B60W 50/00* (2006.01)

(52) U.S. Cl.
CPC .... *B60W 60/0015* (2020.02); *B60W 50/0097* (2013.01); *B60W 60/00274* (2020.02); *B60W 2554/20* (2020.02); *B60W 2554/4045* (2020.02); *B60W 2556/10* (2020.02); *B60W 2556/40* (2020.02)

(58) Field of Classification Search
CPC .. G08G 5/70; G08G 5/25; G08G 5/34; G08G 5/53; G08G 5/55; G08G 5/723; G08G 5/21
See application file for complete search history.

(56) References Cited

U.S. PATENT DOCUMENTS

| | | | |
|---|---|---|---|
| 8,706,352 B2 | 4/2014 | Hayakawa et al. | |
| 10,269,257 B1 | 4/2019 | Gohl et al. | |
| 10,303,178 B1 * | 5/2019 | Gutmann | G01S 13/931 |
| 10,698,407 B2 | 6/2020 | Ostafew | |
| 11,040,729 B2 | 6/2021 | Zhao et al. | |
| 11,433,922 B1 | 9/2022 | Van Heukelom et al. | |

(Continued)

FOREIGN PATENT DOCUMENTS

| | | | |
|---|---|---|---|
| CN | 113682300 A * | 11/2021 | B60W 30/0956 |
| CN | 114475645 A * | 5/2022 | B60W 60/0015 |

(Continued)

OTHER PUBLICATIONS

Alsterda et al., Contingency Model Predictive Control for Autmotaed Vehicles; Cornell University; arXiv:1903.08818v1 [cs.SY];Mar. 21, 2019; 6 pages.

*Primary Examiner* — Mary Cheung
(74) *Attorney, Agent, or Firm* — Young Basile Hanlon & MacFarlane, P.C.

(57) ABSTRACT

An evidence grid is established in a map frame based on the vehicle's pose. Hazard data is accumulated in the evidence grid by gathering visible grid cells, each associated with a visibility probability indicating a history of visibility determinations, and accumulating hazard presence, with each grid cell linked to a hazard associated with a hazard presence probability indicating a history of hazard presence determinations. The accumulated hazard data is then provided to a process within the autonomous vehicle for further decision-making or risk mitigation.

20 Claims, 14 Drawing Sheets

(56) References Cited

U.S. PATENT DOCUMENTS

| | | | | |
|---|---|---|---|---|
| 11,738,772 | B1 | 8/2023 | Beller et al. | |
| 12,017,632 | B1 * | 6/2024 | Valverde | B60W 60/00274 |
| 12,071,127 | B2 | 8/2024 | Tam et al. | |
| 12,179,795 | B2 | 12/2024 | Henke et al. | |
| 12,194,991 | B2 | 1/2025 | Kobashi et al. | |
| 2004/0119610 | A1 | 6/2004 | Maemura et al. | |
| 2007/0233343 | A1 | 10/2007 | Saito et al. | |
| 2009/0254235 | A1 | 10/2009 | Kuroda | |
| 2010/0026555 | A1 | 2/2010 | Whittaker et al. | |
| 2010/0235033 | A1 | 9/2010 | Yamamoto et al. | |
| 2010/0324823 | A1 | 12/2010 | Kobayashi et al. | |
| 2014/0379179 | A1 | 12/2014 | Goossen et al. | |
| 2015/0046078 | A1 | 2/2015 | Biess et al. | |
| 2015/0210279 | A1 | 7/2015 | Agnew et al. | |
| 2017/0329332 | A1 | 11/2017 | Pilarski et al. | |
| 2017/0336795 | A1 | 11/2017 | Wei et al. | |
| 2018/0151075 | A1 | 5/2018 | Claesson | |
| 2018/0154723 | A1 | 6/2018 | Anderson et al. | |
| 2018/0178784 | A1 | 6/2018 | Ohta | |
| 2018/0194354 | A1 | 7/2018 | Takeda | |
| 2019/0009784 | A1 | 1/2019 | Takeda | |
| 2019/0025843 | A1 | 1/2019 | Wilkinson et al. | |
| 2019/0113918 | A1 | 4/2019 | Englard et al. | |
| 2019/0129831 | A1 | 5/2019 | Goldberg | |
| 2019/0243371 | A1 | 8/2019 | Nister et al. | |
| 2019/0355257 | A1 | 11/2019 | Caldwell et al. | |
| 2019/0369616 | A1 * | 12/2019 | Ostafew | G08G 1/0112 |
| 2019/0383631 | A1 | 12/2019 | Bigio et al. | |
| 2019/0384302 | A1 * | 12/2019 | Silva | B60W 60/00272 |
| 2020/0086855 | A1 | 3/2020 | Packer et al. | |
| 2020/0133280 | A1 | 4/2020 | Seccamonte et al. | |
| 2020/0148223 | A1 | 5/2020 | Fukatani et al. | |
| 2020/0156640 | A1 | 5/2020 | Jonasson et al. | |
| 2020/0191972 | A1 | 6/2020 | Zhao et al. | |
| 2020/0211394 | A1 | 7/2020 | King et al. | |
| 2020/0216091 | A1 | 7/2020 | Vladimerou | |
| 2020/0278681 | A1 | 9/2020 | Gier et al. | |
| 2020/0310467 | A1 | 10/2020 | Birkedahl et al. | |
| 2020/0341474 | A1 | 10/2020 | Zuo | |
| 2020/0364892 | A1 | 11/2020 | Ko et al. | |
| 2020/0410062 | A1 | 12/2020 | O'Malley | |
| 2021/0031760 | A1 | 2/2021 | Ostafew et al. | |
| 2021/0055741 | A1 | 2/2021 | Kawanai et al. | |
| 2021/0061269 | A1 | 3/2021 | Petroff et al. | |
| 2021/0086795 | A1 * | 3/2021 | Zhao | G05D 1/0274 |
| 2021/0090357 | A1 | 3/2021 | Diamond et al. | |
| 2022/0097736 | A1 | 3/2022 | Lin et al. | |
| 2022/0119016 | A1 | 4/2022 | Rajvanshi et al. | |
| 2022/0135128 | A1 | 5/2022 | Dan et al. | |
| 2022/0219711 | A1 | 7/2022 | Ohashi et al. | |
| 2022/0324442 | A1 | 10/2022 | Ma et al. | |
| 2023/0012853 | A1 | 1/2023 | Tam et al. | |
| 2023/0121388 | A1 | 4/2023 | Khan et al. | |
| 2023/0124314 | A1 * | 4/2023 | Foster | G01S 17/89<br>701/26 |
| 2023/0126923 | A1 | 4/2023 | Okura et al. | |
| 2023/0145472 | A1 | 5/2023 | Ehmann | |
| 2023/0159026 | A1 | 5/2023 | Pan et al. | |
| 2023/0159056 | A1 * | 5/2023 | Cheng | B60W 50/0098<br>701/301 |
| 2024/0109533 | A1 | 4/2024 | Tam et al. | |
| 2024/0140424 | A1 | 5/2024 | Voigt | |
| 2024/0149912 | A1 | 5/2024 | Tam et al. | |
| 2024/0208531 | A1 * | 6/2024 | Schier | B60W 60/001 |
| 2024/0300482 | A1 * | 9/2024 | Aizawa | B60W 30/09 |
| 2024/0326858 | A1 | 10/2024 | Denby et al. | |
| 2025/0002049 | A1 | 1/2025 | Tam et al. | |

FOREIGN PATENT DOCUMENTS

| | | | | | |
|---|---|---|---|---|---|
| CN | 114894206 | A | | 8/2022 | |
| CN | 115097857 | A | * | 9/2022 | G05D 1/0808 |
| DE | 102021126077 | A1 | | 4/2023 | |
| EP | 3381758 | A1 | | 10/2018 | |
| EP | 3611069 | A1 | | 2/2020 | |
| JP | 2009-217692 | A | | 9/2009 | |
| JP | 2011-198247 | A | | 10/2011 | |
| JP | 2012-188021 | A | | 10/2012 | |
| JP | 2016146113 | A | * | 8/2016 | G06V 20/56 |
| JP | 2017-114405 | A | | 6/2017 | |
| JP | 2018-049496 | A | | 3/2018 | |
| JP | 2019-040427 | A | | 3/2019 | |
| JP | 2024128291 | A | | 9/2024 | |
| WO | 2018/225575 | A1 | | 12/2018 | |
| WO | 2019/098216 | A1 | | 5/2019 | |
| WO | WO-2022016941 | A1 | * | 1/2022 | B60W 60/0011 |

* cited by examiner

EVIDENCE GRID FOR VEHICLE NAVIGATION

TECHNICAL FIELD

This application relates generally to autonomous vehicles, and more specifically to hazard determination using an evidence grid.

BACKGROUND

Autonomous vehicles (AVs) are designed to navigate complex environments that are often filled with various hazards, both static and dynamic. These hazards can include other vehicles, pedestrians, cyclists, and unexpected obstacles such as debris or construction zones. For autonomous vehicles to operate safely and efficiently, it is critical to detect these hazards accurately and assess their potential impact on the vehicle's path. Proper hazard detection and assessment enable the vehicle to make informed decisions, avoid collisions, and ensure a smooth and safe driving experience.

SUMMARY

Disclosed herein are aspects, features, elements, and embodiments for evidence grid for vehicle navigation.

A first aspect is a method that includes establishing an evidence grid in a map frame based on a pose of an autonomous vehicle; accumulating hazard data in the evidence grid by: accumulating visible grid cells in the evidence grid, where each visible grid cell is associated with a respective visibility probability indicating a history of visibility determinations associated with the visible grid cell; and accumulating hazard presence in the evidence grid, where each grid cell associated with a presence of a hazard is associated with a hazard presence probability indicating a history of hazard presence determinations with respect to the each grid cell; and providing the hazard data to a process within the autonomous vehicle for further decision-making or risk mitigation.

A second aspect is a vehicle that includes a memory and a processor. The processor is configured to execute instructions stored in the memory to establish an evidence grid in a map frame based on a pose of an autonomous vehicle; accumulate hazard data in the evidence grid, where to accumulate the hazard data in the evidence grid includes to: accumulate visible grid cells in the evidence grid, where each visible grid cell is associated with a respective visibility probability indicating a history of visibility determinations associated with the visible grid cell; and accumulate hazard presence in the evidence grid, where each grid cell associated with a presence of a hazard is associated with a hazard presence probability indicating a history of hazard presence determinations with respect to the each grid cell; and provide the hazard data to a process within the autonomous vehicle for further decision-making or risk mitigation.

A third aspect is a non-transitory computer-readable medium storing instructions operable to cause one or more processors to perform operations. The operations include establishing an evidence grid in a map frame based on a pose of an autonomous vehicle. The operations also include accumulating hazard data in the evidence grid by: accumulating visible grid cells in the evidence grid, where each visible grid cell is associated with a respective visibility probability indicating a history of visibility determinations associated with the visible grid cell; and accumulating hazard presence in the evidence grid, where each grid cell associated with a presence of a hazard is associated with a hazard presence probability indicating a history of hazard presence determinations with respect to the each grid cell. The operations also include providing the hazard data to a process within the autonomous vehicle for further decision-making or risk mitigation. These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
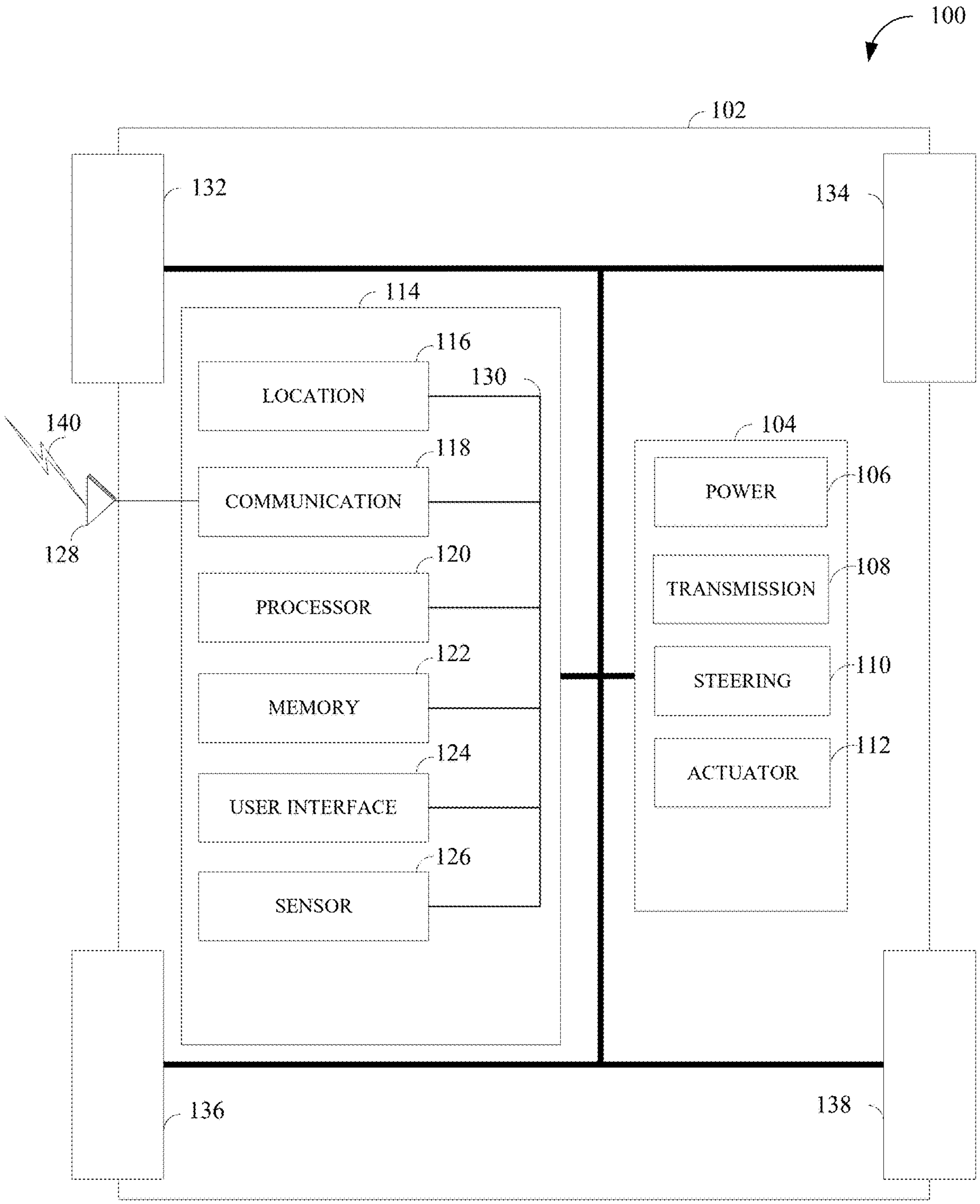
FIG. 1 is a diagram of an example of a portion of a vehicle in which the aspects, features, and elements disclosed herein may be implemented.

AVs frequently encounter various potential hazards, both static and dynamic, such as parked vehicles, pedestrians, and other moving objects. Proactive risk mitigation (PRM) is an approach to automatically mitigate risks from such hazards, ensuring a safe and human-like driving experience. However, current PRM approaches have two main drawbacks: they accumulate and track hazards relative to the path of the ego vehicle (i.e., the AV itself), requiring a reset of the accumulated hazard data whenever the path changes; and the hazard data and risk zones are only used within PRM, preventing other processes executing within the AV from accessing this valuable information.

Implementations according to this disclosure solve problems such as these by maintaining and utilizing a risk field through an evidence grid. Unlike a conventional occupancy grid parser, the risk field according to this disclosure accumulates non-drivable points, objects, and hazards in the map frame. This map-based accumulation retains the probability and belief of obstacle and hazard locations, allowing for the immediate use of previously accumulated information, even when the path changes.

The risk field approach described herein offers several significant advantages over traditional path-based and occupancy grid implementations. One of the key benefits is that accumulated data about hazards and objects remain even when the ego vehicle's reference path changes or resets. This retention of data leads to greater stability and smoother driving, as systems like PRM can utilize the hazard data from the risk field without needing to re-accumulate information. Additionally, the tiered approach to hazard accumulation ensures that the risk field remains useful even without the ego vehicle's reference path, making hazard assessment robust and reliable.

The evidence grid approach in the risk field classifies objects and accumulates visible space and non-drivable areas irrespective of the path of the ego vehicle. This means historical accumulations are maintained and reused if the path of the ego vehicle changes. Furthermore, the risk field accumulates the future positions of hazards where they are predicted to interact with the ego vehicle over time based on the vehicle's path. This allows for a more comprehensive and dynamic understanding of the environment, enhancing the safety and efficiency of the navigation of the ego vehicle. Another advantage is that hazard data and risk zones can now be made available to other modules or executing processes of the ego vehicle. This opens up new possibilities, such as visualizing risk zones for driver assistance, enhancing overall safety and situational awareness. The risk field also improves hazard and object association, effectively mitigating issues related to duplicated objects, occluded objects, and the erroneous labeling of previously tracked world model objects as new.

By accumulating all hazards and objects on a grid in a map frame, multiple hazards can be tracked and evaluated within an area as a group, rather than individually. This holistic approach allows for more comprehensive risk assessment and management, ensuring that the ego vehicle can navigate complex environments with greater accuracy and safety.

To describe some embodiments of evidence grid for vehicle navigation according to the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals; power, such as electrical power or torque; or both information and power may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices. The processor 120 may also implement some or all of the proactive risk mitigation described herein.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), Institute of Electrical and Electronics Engineers (IEEE) 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

The vehicle, such as the vehicle 100, may be an autonomous vehicle or a semi-autonomous vehicle. For example, as used herein, an autonomous vehicle as used herein should be understood to encompass a vehicle that includes an advanced driver assist system (ADAS). An ADAS can automate, adapt, and/or enhance vehicle systems for safety and better driving such as by circumventing or otherwise correcting driver errors.

Figure 2:
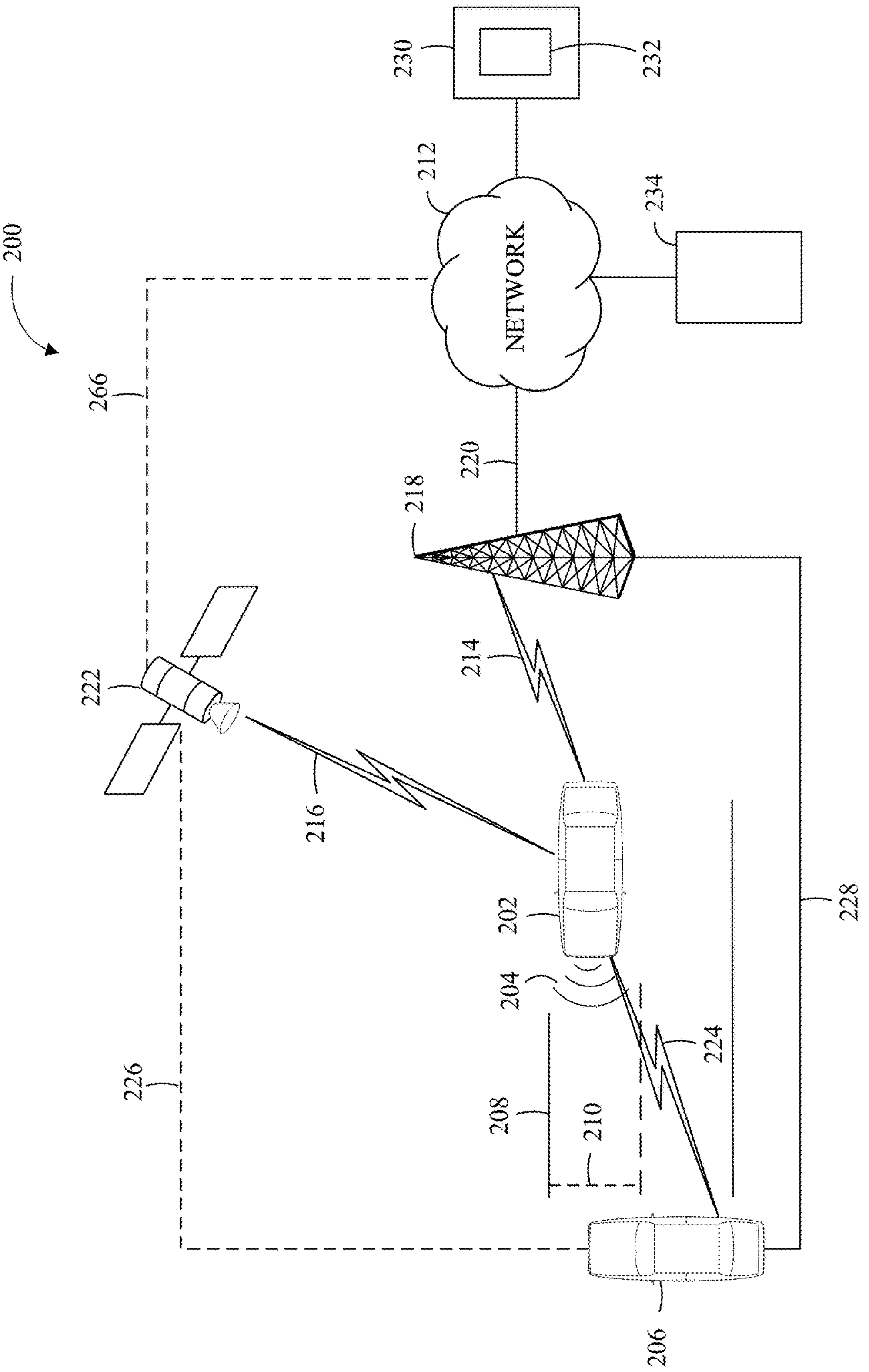
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some embodiments, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
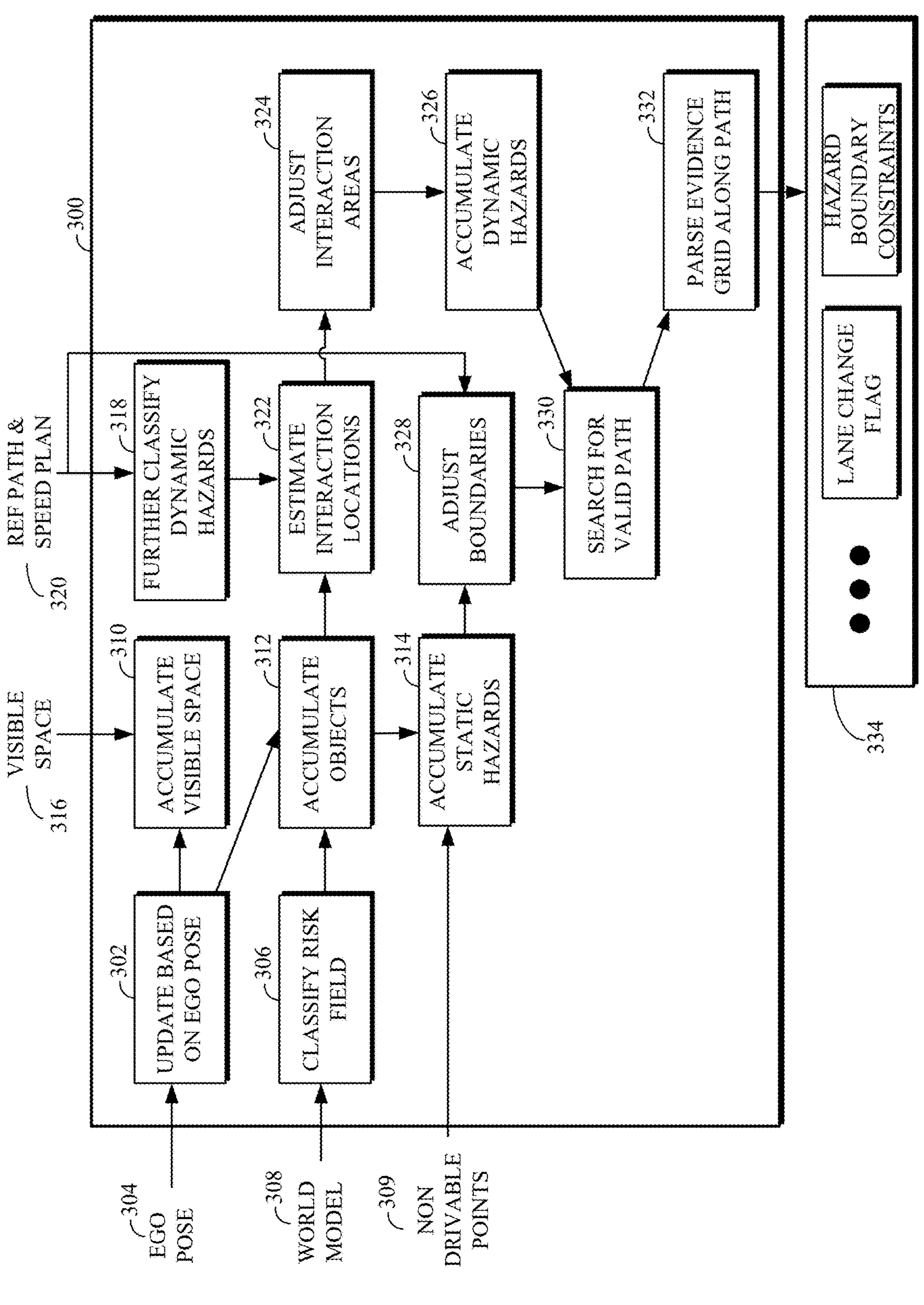
FIG. 3 is an overview of a process for maintaining a risk field.

FIG. 3 is an overview of a process 300 for maintaining a risk field. The process 300 can be implemented by an ego vehicle, which may be the same as or similar to the vehicle 100 or the vehicle 202 of FIG. 2. Maintaining the risk field can mean or include maintaining an evidence grid, as further described herein.

The process 300 can be implemented by one or more tools, such as programs, subprograms, functions, routines, subroutines, operations, executable instructions, and/or the like for, inter alia and as further described below, maintaining the risk field. At least some of the tools can be implemented as respective software programs that may be executed by one or more processors, such as the processor 120 of FIG. 1. A software program can include machine-readable instructions that may be stored in a memory such as the memory 122 of FIG. 1, and that, when executed by the processor, may cause the vehicle to perform the instructions of the software program. At least some steps, or operations, of the process 300 or another technique, method, process, or algorithm described in connection with the implementations disclosed herein can be implemented directly in hardware, firmware, software executed by hardware, circuitry, or a combination thereof.

At 302, the evidence grid is updated based on a pose 304 of the ego vehicle. The pose 304 can be received as an input to the process 300. The pose 304 refers to the position and orientation of the ego vehicle within the environment. This includes the coordinates (e.g., latitude and longitude) and heading or direction of travel of the ego vehicle. Updating the evidence grid based on the pose of the ego vehicle provides a consistent frame of reference for tracking hazards, independent of the path or speed of the ego vehicle. This allows for seamless integration with the risk field, enhancing the vehicle's ability to navigate safely by leveraging accumulated hazard data. Updating the evidence grid can be as described with respect to FIG. 4A. Updating the evidence can also include identifying (e.g., marking) grid cells as non-drivable points in the evidence grid, as described with respect to FIG. 4B.

GPS data can be used to identify the location of the ego vehicle. That is, the GPS data is said to be used to localize the ego vehicle. Localizing the ego vehicle includes identifying the portion of a map (such as a high-precision, high-definition (HD) map) for which the evidence grid is established (e.g., maintained or updated). HD map data from an HD map can be used by an autonomous vehicle, such as the ego vehicle. The HD map data can include accurate information regarding a vehicle transportation network to within a few centimeters. For example, the HD map data can include details regarding road lanes, road dividers, traffic signals, traffic signs, speed limits, and the like.

Figure 4A:
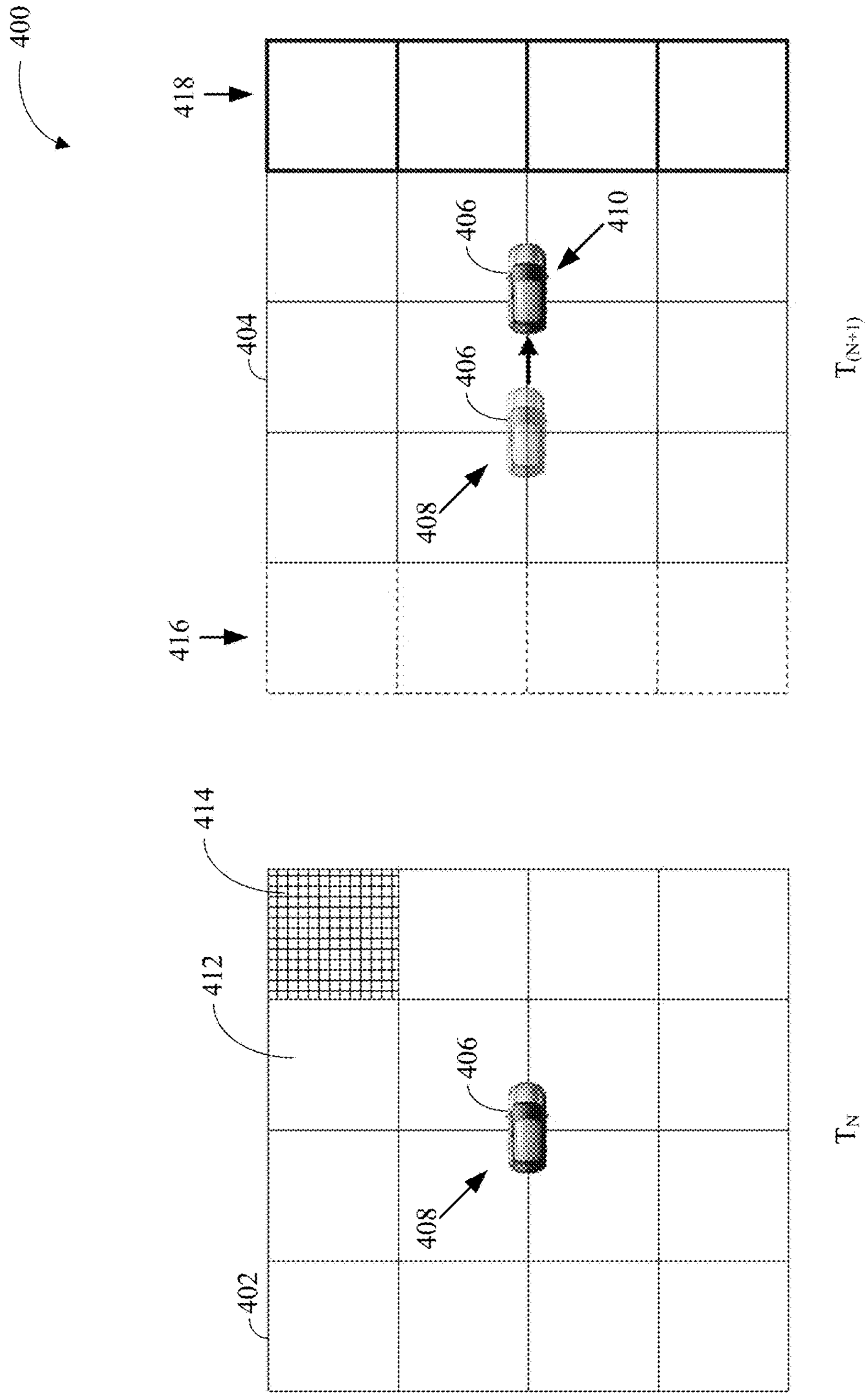
FIG. 4A illustrates an example of an evidence grid at different points in time.

FIG. 4A illustrates an example 400 of an evidence grid at different points in time. Initially (such as when the ego vehicle starts), a tiled evidence grid is established around the ego vehicle. At each point in time (e.g., as the ego vehicle proceeds forwards or backwards), the updated pose of the ego vehicle is compared against the existing evidence grid tiles.

The evidence grid is a two-dimensional (2D) grid structure that accumulates evidence of hazards which may interact with the ego vehicle. The evidence grid is represented in a memory, such as the memory 122 of FIG. 1, by one or more suitable data structures. In one implementation, one single evidence grid can be maintained and temporal data (e.g., interaction zones) may be overlayed thereon. In another implementation, an evidence grid can be separately maintained for each time step. In both implementations, the evidence grids can be visualized as described herein.

The grid consists of multiple cells, each representing a small area in the environment surrounding the ego vehicle. Data stored within (e.g., in association with) the grid cells can include object identifiers, hazard types, sensor visibility, and the probability that a hazard is present, amongst other data, and as further described herein. The evidence grid serves as a foundational element of the risk field, enabling the ego vehicle (i.e., the process 300 executing therein) to identify, track, and predict hazards dynamically. The risk field leverages the evidence grid to classify, accumulate, and manage both static and dynamic hazards, ensuring a comprehensive and real-time assessment of the surrounding environment, as further described herein.

At time $T_N$, an evidence grid 402 is centered around the ego vehicle 406, which has a pose 408. The evidence grid 402 consists of multiple tiles, each representing a segment of the environment surrounding the ego vehicle 406. The environment is partitioned into tiles, such as a tile 412. Each tile is further partitioned into multiple grid cells (e.g., smaller grid cells), such as a grid cell 414. The smaller grid cells are used for higher resolution tracking of hazards or objects. At a subsequent time $T_{(N+1)}$, the evidence grid 404 has shifted to accommodate the movement of the ego vehicle 406 to a new pose 410. To illustrate the scale of the evidence grid, and without limitations, the evidence grid may include 16 tiles, each tile having a size of 50 meters by 50 meters; and each tile may be further partitioned into smaller grid cells, each with a size of 0.5 meters by 0.5 meters.

As the ego vehicle 406 moves, new grid tiles 418 are created in the direction of the movement (according to the new pose 410), while old grid tiles 416 that are no longer relevant are discarded. Grid tiles may be deemed irrelevant when they fall outside the sensor range of the ego vehicle for at least a minimum duration of time. Discarding these outdated tiles helps to optimize memory usage and computational efficiency, ensuring that the system focuses on the most pertinent and current environmental data. This dynamic updating of the evidence grid ensures that the surroundings of the ego vehicle are continuously and accurately maintained, enabling effective hazard detection and risk management.

Each grid cell represents (e.g., occupies) a small area and is used to store evidence (e.g., data) of a hazard's presence in that grid cell. As mentioned, appropriate data structures may be associated with each tile and with each grid cell. As further described herein, object identifiers, hazard types, and sensor visibility may be associated with each grid cell. Additionally, with respect to hazards (i.e., objects) determined to occupy a grid cell, respective probabilities may also be associated with the hazards, indicating the degrees of certainty that the hazards are indeed present in the grid cell.

To improve memory efficiency, data of a particular hazard occupying multiple grid cells can be shared among the grid cells. In an implementation, all identified world objects may be stored in a shared data structure (e.g., a hash table). Each world object stored in the shared data structure can be associated with, or assigned, an object identifier (i.e., an object ID). If an object is determined to occupy more than one grid cell, then its object ID can be stored in association with the more than one grid cells. However, some evidence data may not be shareable between grid cells. For example, the probabilities cannot be shared between cells because, for example, each grid cell represents a unique area with its own associated set of sensor readings and environmental factors, leading to different levels of certainty for the presence of the object in each specific location (e.g., grid cell).

Figure 4B:
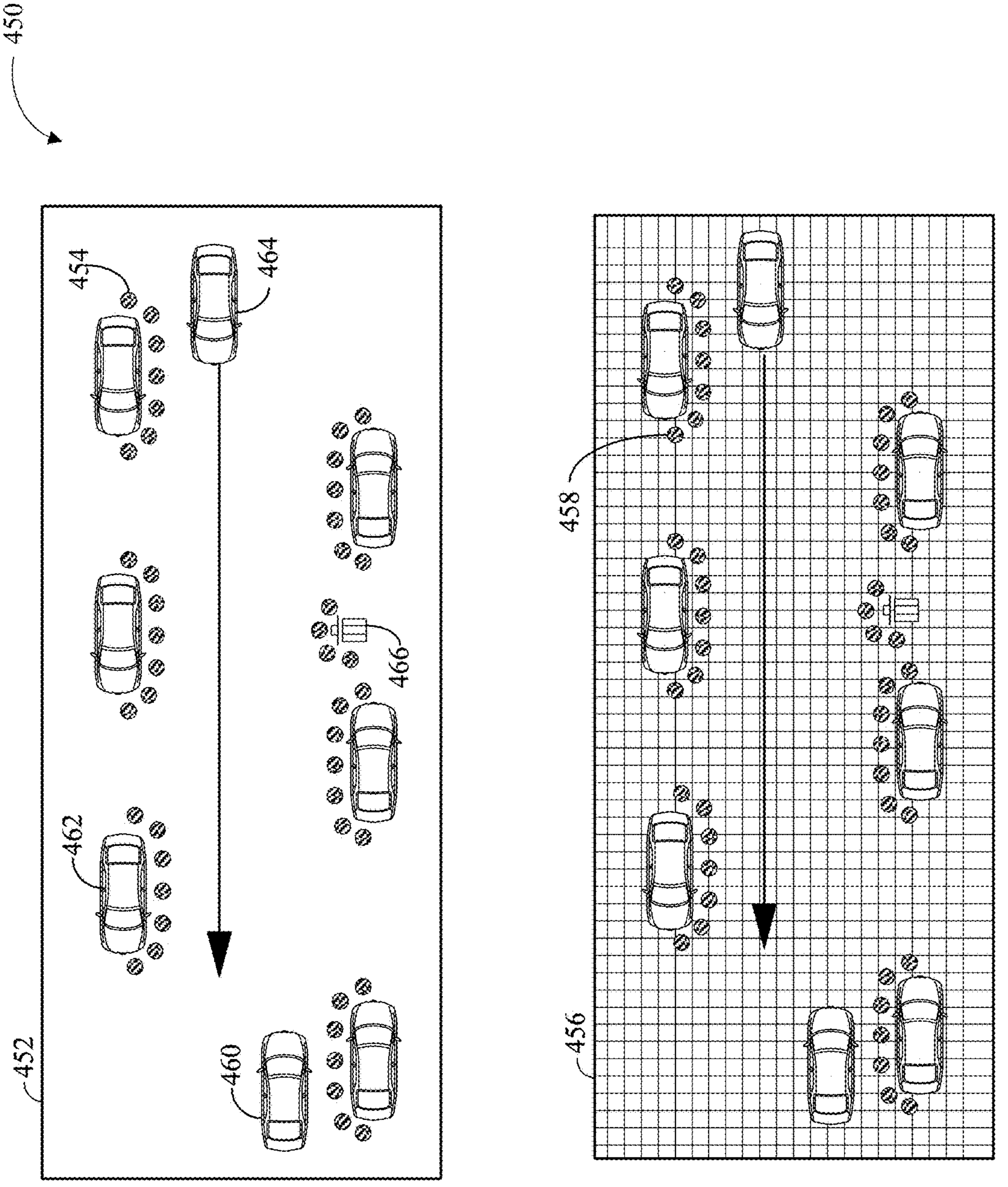
FIG. 4B illustrates an example of identifying non-drivable grid cells in an evidence grid.

FIG. 4B illustrates an example 450 of identifying non-drivable grid cells in an evidence grid. Non-drivable grid cells are also referred to as non-drivable points. The non-drivable points can be identified based on sensor data, such as LiDAR data. The LiDAR data can be the non-drivable points 309 received from a perception module of the ego vehicle. The example 450 illustrates a scene 452 that includes several world objects. Sensor data is used to identify the non-drivable points. The sensor data indicates the existence of stationary boundaries in the scene 452. The non-drivable points, such as a non-drivable point 454, are shown as white-filled circles. A grid 456 of grid cells (i.e., grid cells of the evidence grid) is overlaid over the scene 452. The grid cells corresponding to the non-drivable points are then marked as non-drivable points. As such, a grid cell 458, corresponding to the non-drivable point 454, is marked as a non-drivable point.

Referring again to FIG. 3, at 306, world objects are classified into different hazard types. The world objects that are classified can be included in (e.g., retrieved from) a world model 308 that may be maintained (e.g., updated) by a world model module (not shown) of the ego vehicle. For example, the process 300 may classify a world object into one of a parked vehicle, a moving vehicle, a moving pedestrian, or a set of non-drivable points. Non-drivable points correspond to a detected hazard that cannot be classified into a particular type of object. Examples of non-drivable points include trash cans or curbs. The hazards can be categorized into static hazards or dynamic hazards. Static hazards can be hazards that have not been observed moving and are not expected to be moving soon. Dynamic hazards can be either already in motion or have a high probability of moving soon.

For at least some detected world objects (e.g., a vehicle, a pedestrian, or a bicycle), the world model module can maintain (e.g., predict and update) one or more hypothesis regarding the possible intentions of that world object. Examples of intentions (e.g., hypotheses) include stop, turn right, turn left, go straight, pass, and park. A likelihood may be associated with each hypothesis. The likelihood can be updated based on observations received from sensor data. The world objects are detected based on received sensor data (sensor measurements or sensor observations). The world model module maintains (i.e., associates and updates over time) a state for each hypothesis (e.g., intention) associated with a world object. For example, the state may include predicted locations of the associated world object given the intention of a hypothesis. The world model module continuously receives sensor data (sensor observations). For a given observation, the world model module identifies the world object that the observation is associated with. If an associated world object is found, then the state of each of the hypotheses associated with real-world object are updated based on the observation (e.g., based on the consistency of the observation with the hypothesis). That is, for example, the predicted location of the world object is updated based on the observation received from the real (e.g., physical) world. In summary, the world object model can include world objects and their details as fused based on sensor data. The details can include poses, velocities, and predictions regarding different hypotheses.

Certain hazards, such as moving vehicles, may later (e.g., at 318) be sub-classified, such as into a parallel vehicle, an oncoming vehicle, or other sub-classification. Such sub-classifications could not be determined at this stage (i.e., at 306) of the process 300 due to the lack of path information of the ego vehicle. That is, the world objects cannot be sub-classified without knowing at least the reference path of the ego vehicle.

Figure 4C:
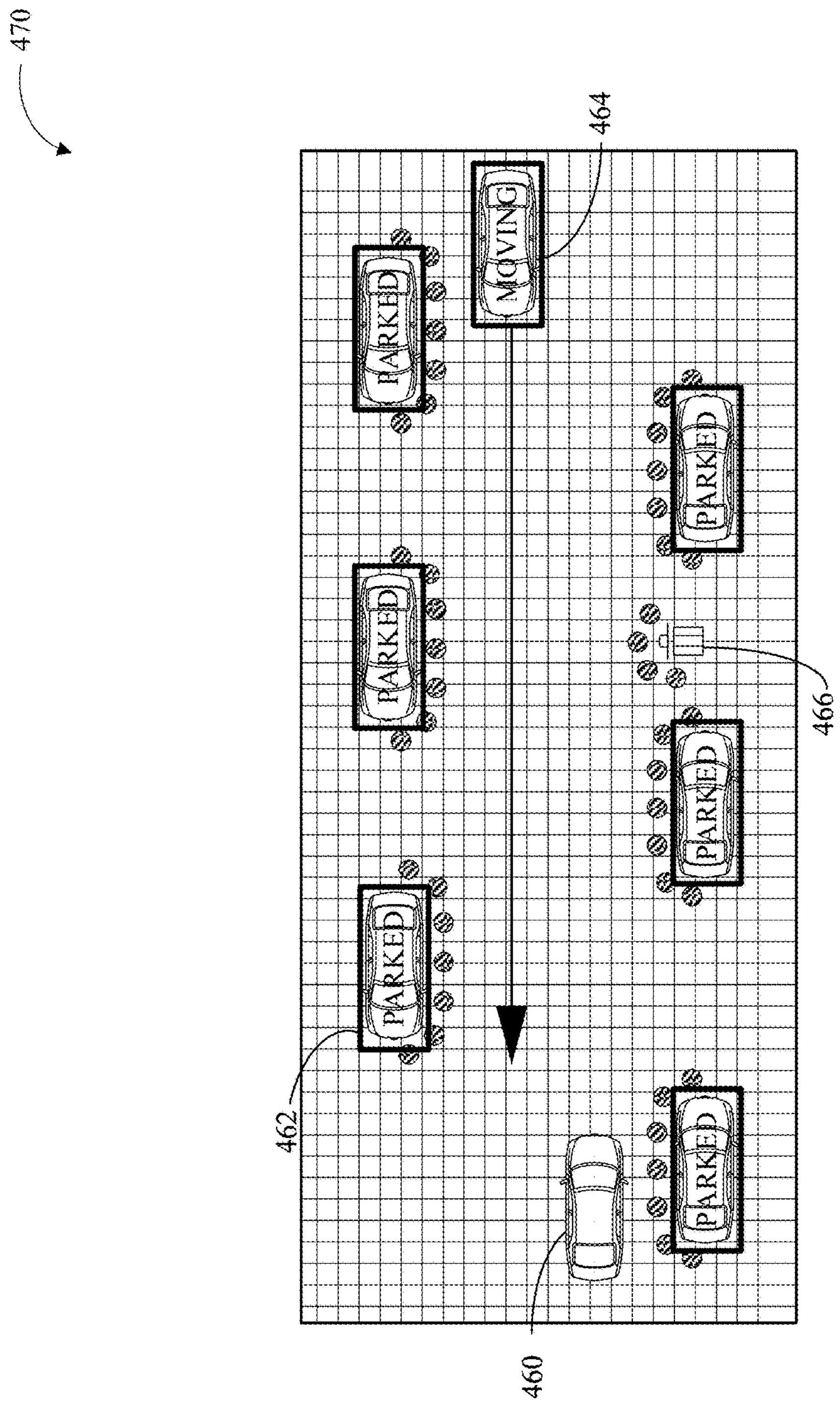
FIG. 4C illustrates an example of risk field classification.

FIG. 4C illustrates an example 470 of risk field classification. The example 500 illustrates classifying world objects of the scene 450 of FIG. 4B. The world model of an ego vehicle 460 of the scene 450 includes an object 462, an object 464, and an object 466, amongst others. The process 300 classified the objects into different hazard types. The object 462 is classified as a parked vehicle, the object 464 is classified as a moving vehicle, and the object 466 is classified as an unknown object. Since, at this point in the process 300, no reference path information of the ego vehicle 460 is available (e.g., is available to the process 300), any moving objects (such as the object 464) cannot be further sub-classified (such as into a leading vehicle, an oncoming vehicle, a following vehicle, a parallel vehicle, etc.).

Referring again to FIG. 3, at this stage of the process 300, an accumulation phase within each grid cell of the evidence grid is performed. The accumulation phase includes accumulating visible space in the evidence grid, at 310; accumulating objects in the evidence grid, at 312; and accumulating static hazards in the evidence grid, at 314. During the accumulation phase, the evidence grid is populated with data that provides a comprehensive view of the environment (i.e., the risk field) surrounding the ego vehicle.

In the accumulation phase, the static objects and non-drivable points are processed to accumulate evidence of static hazards and non-drivable points in each grid cell of each tile. The accumulation phase can include storing hazard information associated with each hazard and the presence of a hazard is assigned to each grid cell that the hazard occupies; and at each time step, increasing/decreasing the probability that the hazard exists in the grid cell that the hazard occupies. Thus, the lack of occupancy decreases existing hazard probabilities within each grid cell. Visible space is also accumulated in the evidence grid. At each time step, the visibility level of a grid cell that is within the line-of-sight of the sensors of the ego vehicle increases therewith measuring the visibility level of the grid cell location. The longer and more consistent that the grid cell is visible, the higher the visibility level of that location. The visibility level of a grid cell is referred to herein as a visibility probability.

Visibility probability is a metric that quantifies the extent to which a grid cell is determined to be visible to the sensors of the ego vehicle. The visibility probability can be calculated based on the frequency and consistency of sensor detections over time. A higher visibility probability indicates that a grid cell has been consistently detected by the sensors, suggesting a higher degree of confidence in the visibility of that grid cell. Conversely, a lower visibility probability indicates less frequent or inconsistent detections. The visibility probability metric helps in distinguishing grid cells with reliable sensor coverage from those with potential occlusions or intermittent visibility.

At 310, visible space is accumulated in the evidence grid based on a visible space 316 received from a perception module of the ego vehicle. The visible space includes visible grid cells. The perception module processes sensor data from various sources such as cameras, LiDAR, and radar to determine the areas around the ego vehicle that are currently visible. This visible space information is then integrated into the evidence grid, where each grid cell is updated to reflect the visibility status. Cells within the line-of-sight of the ego vehicle's sensors will have higher visibility values, while occluded or obstructed cells will have lower visibility values. Visibility probabilities are associated with grid cells to indicate the degrees of certainty that the grid cells are visible. The visible space can be used to determine, for example, the extent and quality of the sensor coverage around the ego vehicle. Colloquially, the visible space can be used to determine how far and what the ego vehicle can "see."

At 312, objects within the environment are accumulated in the evidence grid. These objects can include other vehicles, pedestrians, cyclists, and various obstacles detected by the ego vehicle's sensors. Each detected world object is assigned an object ID and classified into different hazard types.

At 314, static hazards are accumulated in the evidence grid. Static hazards refer to non-moving obstacles such as parked cars, curbs, trash cans, and construction barriers. These hazards are detected by the perception module and their positions are recorded in the grid cells they occupy. Unlike dynamic objects, static hazards do not change position, but their continuous monitoring is essential to ensure safe navigation. The probabilities of the presence of these static hazards in grid cells are updated in the evidence grid based on repeated sensor readings, improving the reliability of the hazard data.

The probabilities (i.e., hazard presence probabilities) associated with the presence of hazards in the grid cells may both increase and decrease at each time step. The longer a hazard occupies a cell, the higher the probability that the hazard exists in that grid cell. Conversely, if a hazard, such as a parked car, is no longer detected as the ego vehicle approaches, it may indicate a false identification or false classification. In such cases, the probability of the hazard's presence will gradually decrease and fade into the background, losing its accumulated probability.

Probabilities may decrease due to several factors, including the absence of a previously detected object in subsequent sensor readings or the detection of an object being less certain due to increased sensor noise or environmental conditions. As such, the risk field can be more robust to noise, prediction errors, and tracking sensor noise because objects can appear (e.g., be perceived) and disappear (e.g., not be perceived) from sensor detection, especially in low visibility areas. The process 300 can evaluate how confident it is that a hazard or object is present in a grid cell. For example, if an object is behind a bush, visibility might be intermittent, leading to fluctuating confidence levels. Therefore, the probability values provide a measure of confidence regarding the presence of a hazard in a specific area.

Probability scaling can be used to adjust the likelihood values of detected objects based on the confidence levels in the sensor data. The probability scaling can be influenced by the certainty of the object detection. For instance, when utilizing a sensor source with low noise levels, such as LiDAR, there is higher confidence in the detection accuracy. Therefore, the probability of the detected object is increased more rapidly. Conversely, if the sensor source has higher noise levels, the probability accumulates more slowly, reflecting the lower confidence in the detection accuracy. This dynamic adjustment of probabilities ensures a reliable and accurate representation of the environment.

Figure 5A:
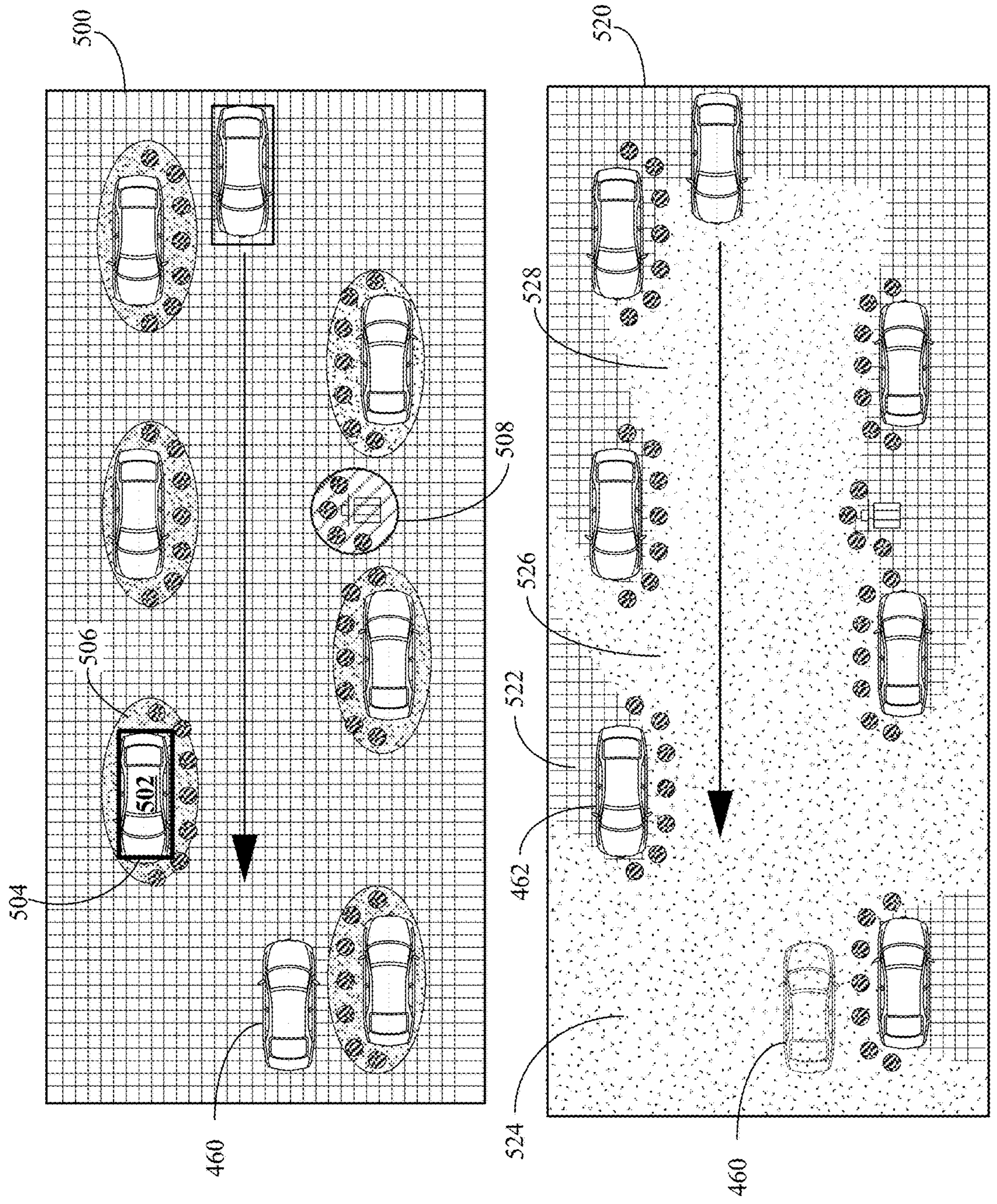
FIG. 5A-5B illustrate the accumulation phase of hazard evidence into an evidence grid.
Figure 5B:
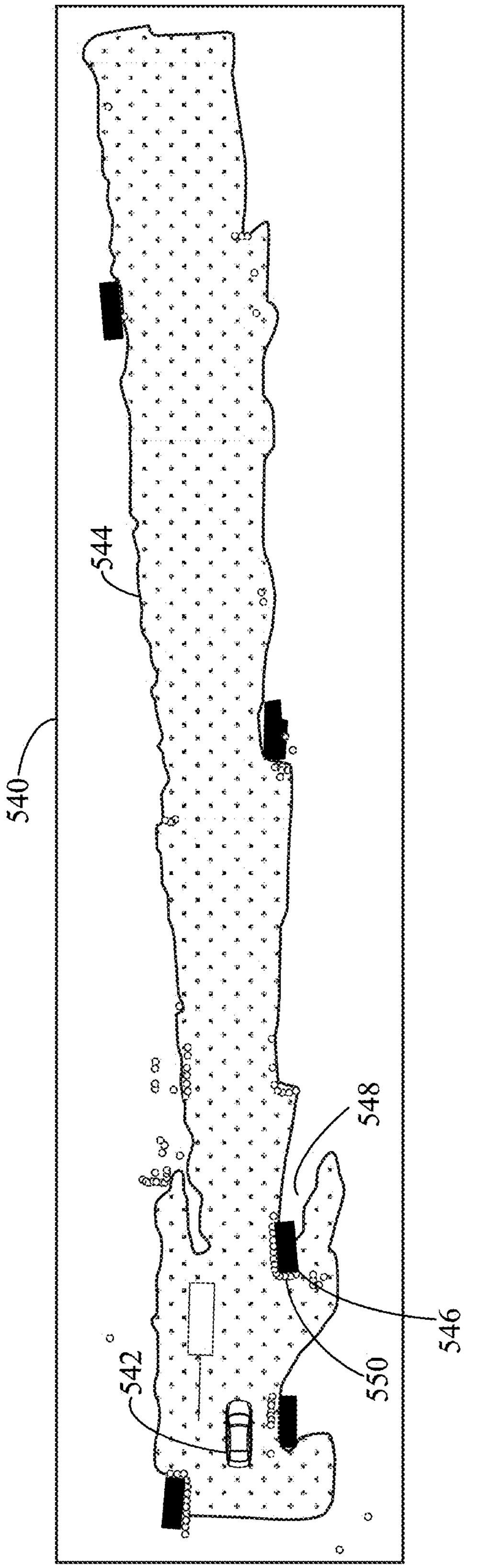

FIG. 5A-5B illustrate the accumulation phase of hazard evidence into an evidence grid. As mentioned above, during the accumulation phase, visible space, objects, and static hazards are accumulated into (e.g., added or updated to) the evidence grid.

An evidence grid 500 of FIG. 5A illustrates the accumulation of hazards and non-drivable points based on identified objects within the map frame of the ego vehicle 460 of FIGS. 4B-4C. The grid cells, such as the grid cells 502, within the evidence grid 500 represent areas where hazards from tracked objects, such as vehicles, pedestrians, and cyclists, have been detected. These grid cells indicate higher probabilities of hazard presence due to consistent sensor readings. The grid cells 502 include those within a bounding box 504 (e.g., a boundary) drawn by the process 300 around an observed or detected object in the map frame of the ego vehicle 460. The process 300 draws bounding boxes around each of the identified objects in the map frame.

Grid cells within augmented areas around objects, such as an augmented area 506, depict regions indicating areas of lower probability for hazard presence. This inconsistency (e.g., uncertainty) may result from prediction inaccuracies or sensor noise, affecting the accumulation of hazard data in grid cells within the augmented areas. Grid cells within the augmented areas are associated with lower confidence in the presence of hazards due, for example, to the aforementioned factors.

Additionally, the grid cells 508 represent non-drivable points, which are areas detected as obstacles that the ego vehicle 460 should avoid. These points are identified by the perception module but are associated with an unclassified (e.g., unrecognized) object. An unclassified object may be a curb, a trash can, or some other stationary barrier. Similar to the augmented area 506, certain of the grid cells 508 may also be associated with variability in detection confidence.

An evidence grid 520, which is the same as the evidence grid 500, illustrates the accumulation of visible space. The evidence grid 520 is used to accumulate and represent data regarding visibility around the ego vehicle 460 of FIG. 4B. Non-visible (occluded) grid cells, such as those in region 522, are obstructed by the object 462 of FIG. 4B, making them less visible to the sensors of the ego vehicle 460.

Grid points closer to the ego vehicle 460 have higher visibility (i.e., higher visibility probabilities) than those further away from the ego vehicle 460. For example, grid points in an area 524, which is nearer to the ego vehicle 460, have higher visibility than grid point in an area 526, which is further away. Similarly, grid points in the area 526 have higher visibility than grid points in an area 528, which is even further away from the ego vehicle 460. To be clear, it is noted that the grid points in an area do not necessarily all have the same visibility probability. The differences in densities of the points in the areas 524 through 528 are intended to illustrate a gradual fading of visibility representing lower visibility of regions further away from the ego vehicle 460.

As already described, the higher visibility of closer grid points can be due to the proximity of these points to the sensors on the ego vehicle 460. Sensors, such as cameras, LiDAR, and radar, have greater accuracy and fewer obstructions when detecting objects and spaces closer to their location. As the distance from the ego vehicle increases, the likelihood of occlusions, environmental interference, and sensor noise also increases, resulting in reduced visibility and confidence in the detection of hazards.

The degree of visibility of a grid point is based on the frequency of observation over time. Grid points that are observed more frequently by the sensors have higher visibility probabilities. These probabilities indicate the confidence level that the grid points are within the line-of-sight and accurately reflect the surrounding environment. For example, the visibility probability of grid point 524 is higher than that of grid point 526, which in turn is higher than that of grid point 528. This probabilistic approach allows the process 300 to account for varying sensor reliability and environmental conditions.

The evidence grid is dynamically updated to reflect the real-time visibility and hazard detection around the ego vehicle 460. By continuously monitoring and adjusting the visibility probabilities of the grid points, the system ensures a comprehensive understanding of the surrounding environment, enhancing the safety and navigation capabilities of the ego vehicle.

FIG. 5B illustrates a visualization 540 of an evidence grid. The visualization 540 includes an ego vehicle 542. The visualization 540 also illustrates a visibility field 544 illustrating the degrees of visibility of the grid points within the visibility field. The visualization 540 also includes identified hazards, such as an object 546, which may be classified as a parked vehicle. The visibility field includes a set of non-visible grid points 548 occluded by the object 546. The visualization 540 also includes non-drivable points shown as white filled circles, such as a grid point 550.

Referring is now again made to FIG. 3. At 318, dynamic hazards are further classified based on a reference path and speed plan 320 of the ego vehicle. The reference path and speed plan 320 can be received from a planning module (not shown) of the ego vehicle. The process 300 may receive or access a portion of the reference path and speed plan 320 corresponding to a real-time planning horizon (e.g., 6 or 10 seconds).

The reference path can be a center line that is derived from a HD or standard-definition (SD) map. The reference path serves as a very rough path that the ego vehicle is intended to follow, typically representing the middle of the lane the vehicle aims to navigate. This path is not yet refined and provides a general trajectory for the vehicle to reach its destination. The reference path may include waypoints and directional information, guiding the vehicle along the desired route. The reference path is typically updated in real-time to account for dynamic changes in the environment, such as road conditions, traffic, obstacles, and identified objects.

The speed plan defines a desired speed of the ego vehicle along the reference path. In the absence of external factors such as objects or obstacles, the speed plan represents the ideal speed profile for the vehicle. This plan is sometimes referred to as a strategic speed plan. The speed plan considers factors such as speed limits, road conditions, and the vehicle's performance capabilities to determine the optimal speed for each segment of the journey. By integrating the speed plan with the reference path, the ego vehicle can achieve a smooth and controlled driving experience, adhering to safety regulations and optimizing travel time.

Depending on the reference path and speed plan 320, the dynamic (i.e., moving) objects may be sub-classified differently. For example, a dynamic object may be sub-classified as a leading vehicle, an oncoming vehicle, a following vehicle, a parallel vehicle, or some other sub-classification. The sub-classification of a dynamic object can be based on a path (e.g., a hypothesis) predicted for the dynamic object.

At 322, interaction locations between the ego vehicle and some of the identified world objects are identified. Identifying the interaction locations with respect to a dynamic object may include determining the potential points in space and time where the paths of the ego vehicle and the dynamic object are predicted to intersect or come into proximity. The process 300 uses the reference path and speed plan 320 of the ego vehicle, along with the predicted paths and velocities of the dynamic objects, to estimate where interactions are likely to occur. This estimation takes into account the current positions, velocities, and predicted trajectories of all dynamic objects, such as leading vehicles, oncoming vehicles, following vehicles, parallel vehicles, and pedestrians.

Identifying the interaction locations may include several sub-steps: Predicting future positions, calculating interaction zones, and updating the evidence grid. In an example, identifying the interaction locations may also include assessing risk levels.

With respect to predicting future positions, the process 300 forecasts the future positions of dynamic objects based on their current motion patterns and any known behaviors (e.g., a vehicle changing lanes or a pedestrian crossing the street). With respect to calculating interaction zones, the process 300 may use the predicted future positions to calculate the zones of potential interactions. An interaction zone is an area where the ego vehicle is said to interact with a hazard over a planning horizon. With respect to updating the evidence grid, the process 300 integrates the interaction zones into the evidence grid, providing a dynamic and comprehensive map of potential hazards. With respect to assessing risk levels, the process 300 may assess the risk levels associated with each interaction zone by considering factors such as relative speeds, distances, and the types of dynamic objects involved. Higher risk levels can be assigned to zones where collisions or near-misses are more likely, enabling processes of the ego vehicle to focus on mitigating the most dangerous interactions first.

At 324, at least some of the interaction areas may be adjusted. This involves refining the previously identified interaction locations between the ego vehicle and dynamic objects, as well as other objects based on their classifications. Adjustments are made to account for uncertainties in the predictions, such as the predicted paths of dynamic objects, and to add safety buffers and contingencies to the interaction areas. Such adjustments enable the planning of safer paths. At 326, the above identified data related to dynamic hazards are accumulated in the evidence grid.

Figure 6A:
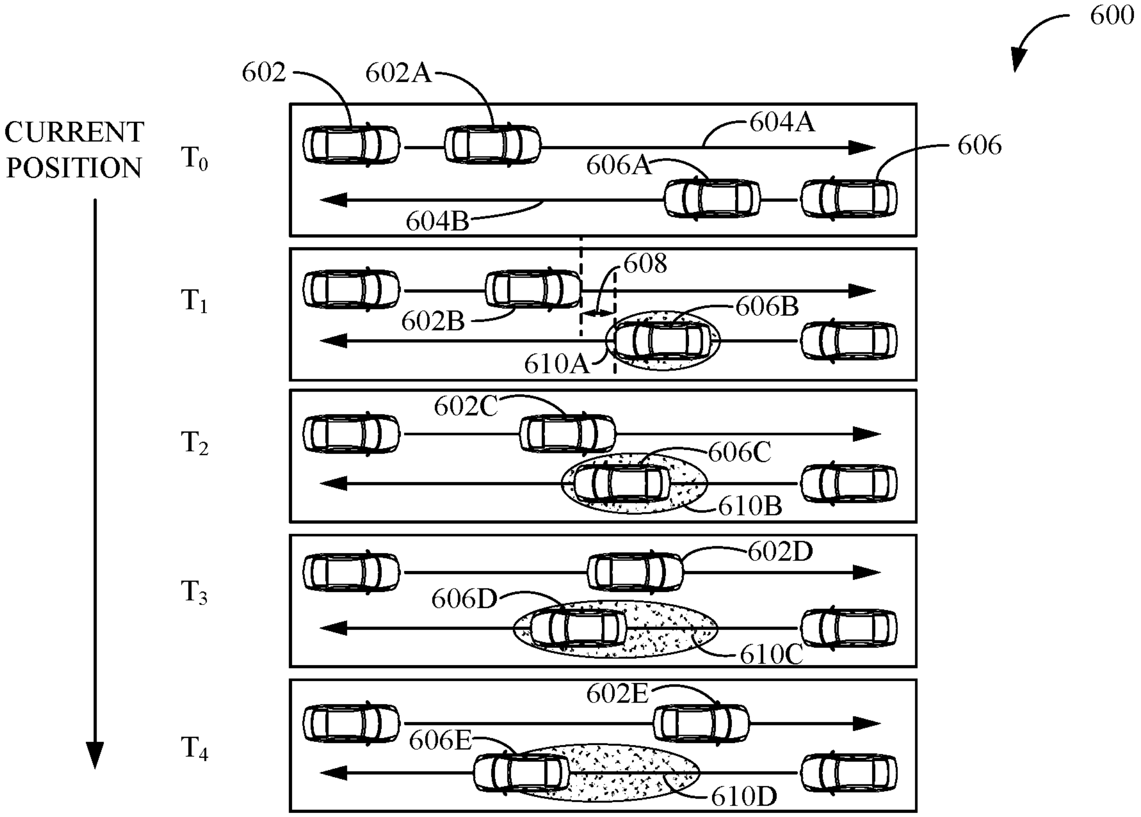
FIG. 6A illustrates an example of accumulating dynamic hazards in an evidence grid.
Figure 6A:
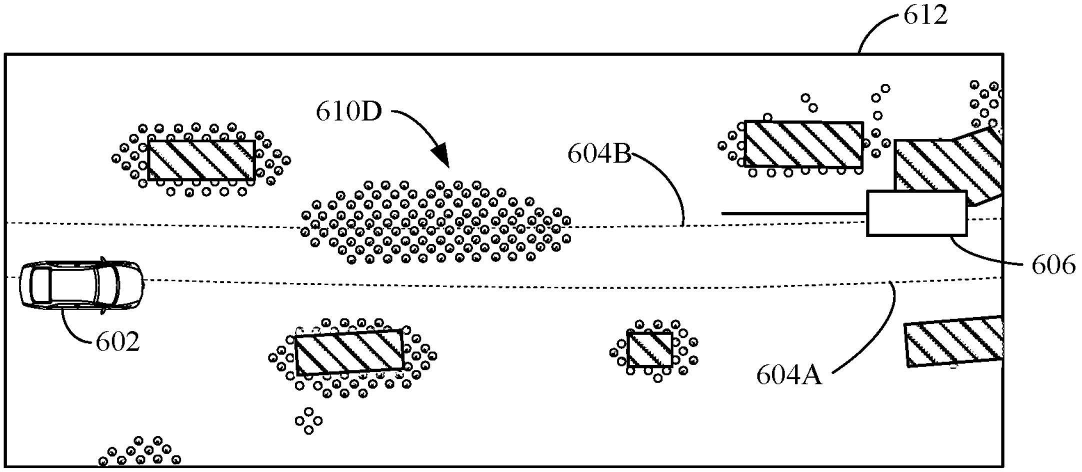

FIG. 6A illustrates an example 600 of accumulating dynamic hazards in an evidence grid. The example 600 illustrates an ego vehicle 602 that is traveling along a reference path 604A and a hazard 606 that has been classified as an oncoming vehicle and is predicted to be following a path 604B. The ego vehicle 602 is planned to be at locations 602A-602E at different points in time corresponding to a planning horizon. The hazard 606 is predicted to be at locations 606A-606E at the different points in time.

The ego vehicle 602 (e.g., the process 300 executing therein) parses dynamic and lead objects to accumulate evidence of dynamic hazards and lead hazards in each cell of each tile (e.g., each grid cell). Given an identified world object, it is determined whether the world object is within a predetermined range X of the ego vehicle 602. Then, at T=Y, it is checked whether the position of the world object is within the range X of the predicted location of the ego vehicle 602. At each time step T within a planning horizon, if the range condition is met, evidence of a hazard corresponding to the world object is accumulated in grid cells matching the position of the world object at that time T. If the range condition is not met for a time step, then nothing is accumulated in the evidence grid with respect to that time step.

The example 600 illustrates that the range condition is met for time steps $T_1$ through $T_4$. An adjustment (e.g., a buffer 608) is added to account for uncertainty in the time of arrival of the hazard 606 at the location 606B. An accumulation of an interaction area between the ego vehicle 602 and the hazard 606 begins is now performed. The interaction area grows over time from an interaction area 610A through 610D. Accumulating the interaction area in the evidence grid includes marking, at the current time $T_0$, all grid cells included in the interaction area 610D as being part of the interaction area. The size of the interaction area 610D is indicative of the duration of interaction between the ego vehicle 602 and the hazard 606. While not specifically shown, the interaction between the ego vehicle 602 and the hazard 606 ends after $T_4$.

A visualization 612 illustrates the result of the accumulation step. The visualization 612 corresponds to the evidence grid as displayed at a current time (To). The visualization 612 includes the ego vehicle 602, the reference path 604A, the hazard 606, and the predicted path 604B of the hazard 606. The visualization 612 also includes the interaction area 610D.

Figure 6B:
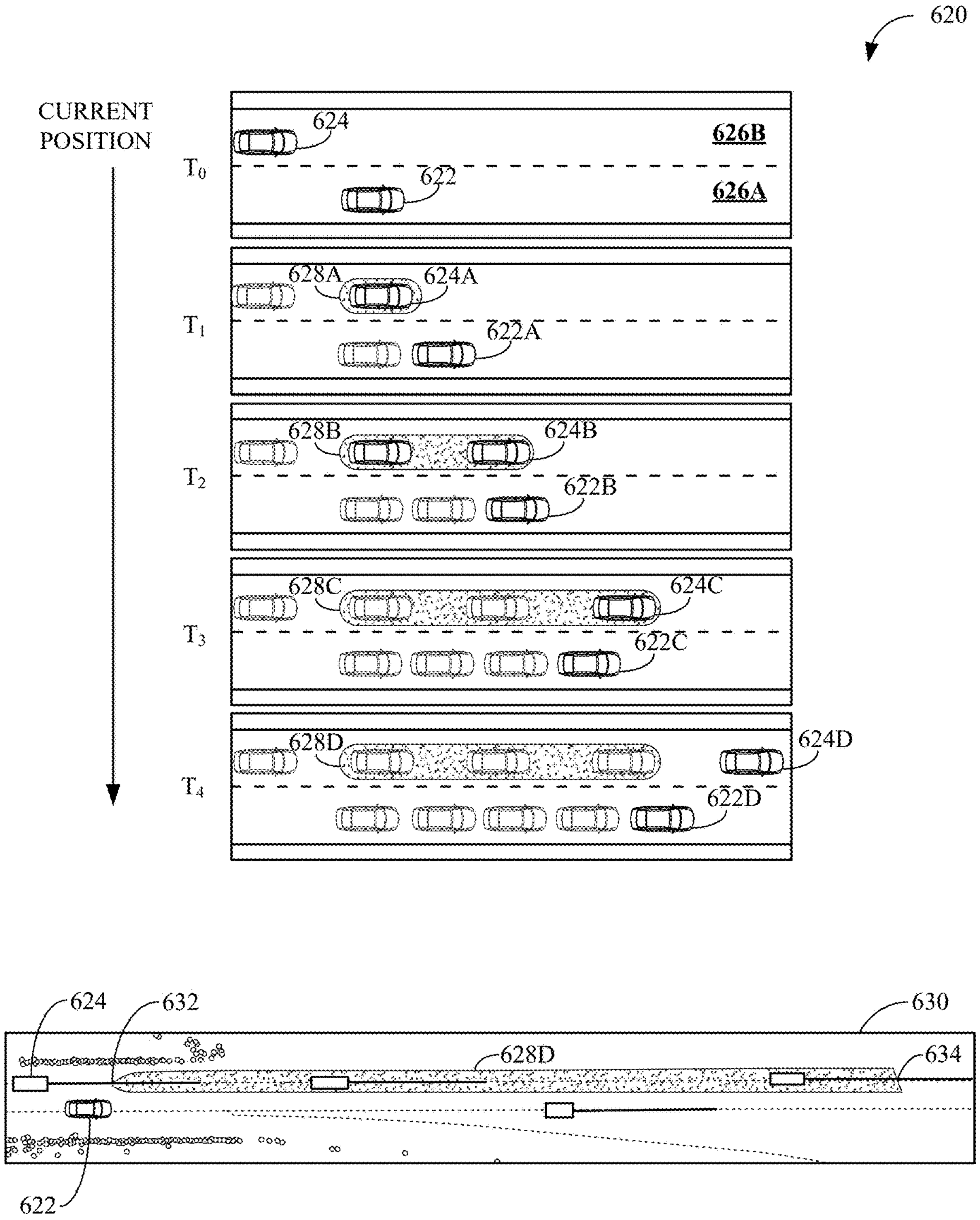
FIG. 6B illustrates an example of accumulating dynamic hazards in an evidence grid.

FIG. 6B illustrates an example 620 of accumulating dynamic hazards in an evidence grid. The example 620 illustrates an ego vehicle 622 and a hazard 624 traveling, in the same direction, on a first lane 626A and a second lane 626B of a road, respectively. The hazard 624 has been classified as a parallel vehicle and is traveling at a higher speed than the ego vehicle 622. The ego vehicle 622 is planned to be at locations 622A-622D at different future time points. The hazard 624 is predicted to be at locations 624A-624D at those different future time points. It is predicted that at the location 624D (e.g., at $T_4$), the hazard 624 leaves the interaction range of ego vehicle 622 because the range condition is no longer met.

The ego vehicle 622 (i.e., the process 300 executing therein) determines that the interaction with the hazard 624 starts at $T_1$ and ends at $T_3$. As such, the ego vehicle 622 accumulates the interaction area over these time steps. The interaction area grows over time from an interaction area 628A through 628D. Accumulating the interaction area in the evidence grid includes marking, at the current time $T_0$, all grid cells included in the interaction area 628D as being part of the interaction area. The size of the interaction area 628D is indicative of the duration of interaction between the ego vehicle 622 and the hazard 624. While not specifically shown, the interaction area 628D may be adjusted to include regions of lower probability due to inconsistent accumulation of hazards from prediction inaccuracies or sensor noise.

A visualization 630 illustrates the result of the accumulation step. The visualization 630 corresponds to the evidence grid as displayed at a current time (To). The visualization 630 includes the ego vehicle 622 and the hazard 624. The visualization 612 also includes the interaction area 628D (which may be referred to as the "accumulated parallel vehicle hazard") along with an expected starting location 632 and an expected ending location 634 of the interaction area between the ego vehicle 622 and the hazard 624.

Figure 6C:
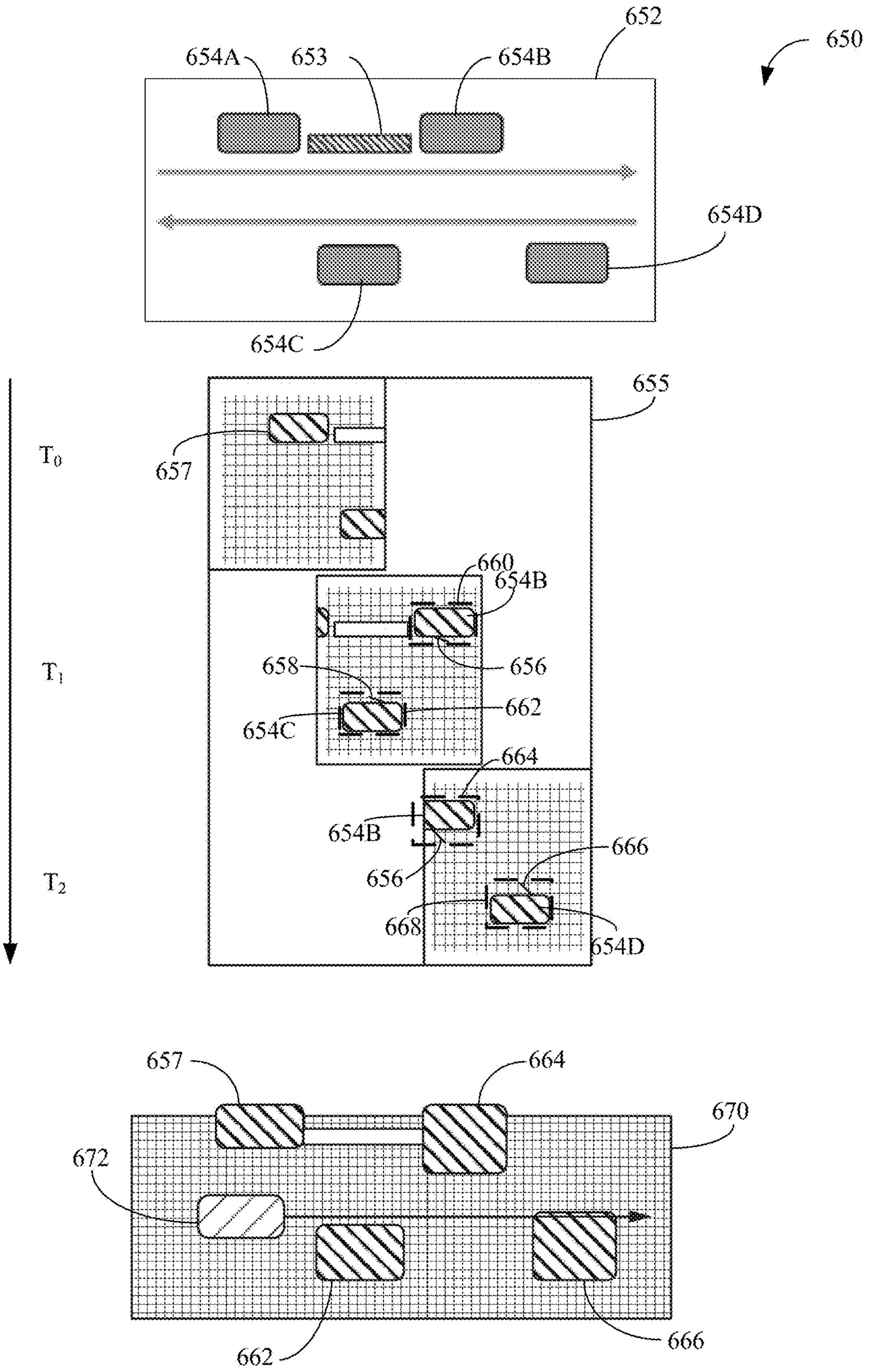
FIG. 6C illustrates an example of making adjustments to static hazards based on a path and speed plan of an ego vehicle.

FIG. 6C illustrates an example 650 of making adjustments to static hazards based on a path and speed plan of an ego vehicle (not shown). The example 650 illustrates a scene 652 that includes a barrier 653 and parked cars 654A-654D. The portions of the evidence grid associated with at least some of the parked cars (classified as static hazards) are adjusted to account for potential dynamic scenarios such as parked car doors opening and/or persons exiting. The evidence grid associated with a parked vehicle can be adjusted based on a level of encroachment of a door of the parked vehicle into the path of the ego vehicle (not shown).

A timeline 655 illustrates that, over time, adjustments are made to account for the potential opening of car doors or persons exiting the parked cars. At time $T_0$, the ego vehicle is planned to pass by the parked car 654A without any anticipated interference from the car doors of the parked car 654A. As time progresses, such as at time $T_1$, the ego vehicle (i.e., the process 300 executing therein) is configured to consider the possibility that the doors of parked cars, such as doors 656 of parked vehicle 654B and door 658 of parked vehicle 654C, may open partially. The evidence grid is adjusted to account for these potential encroachments, extending the hazard boundaries to include these possibilities. This is shown in adjusted evidence grid portions 660 and 662. To illustrate, and without limitations, the boundary may be extended laterally by up to one meter, depending on the distance between the ego vehicle and the parked car.

At time $T_2$, the ego vehicle is expected to have passed the parked vehicle 654C but is still expected to possibly interact with the parked vehicles 654B and 654D. By this time, the doors, such as door 656 and door 666 of parked vehicle 654D, may be fully open. Consequently, the evidence grid is further adjusted to account for these larger encroachments, as shown in adjusted evidence grid portions 664 and 668. These adjustments ensure that the ego vehicle's navigation system can plan a safer path by anticipating and accounting for these potential dynamic scenarios.

A visualization 670 illustrates the result of the adjustment step. The visualization 670 corresponds to the evidence grid as displayed at a current time (To). The visualization 670 includes an ego vehicle 672. The evidence grid shows the adjusted static hazards associated with the parked vehicles 654A-654D. The evidence grid is adjusted to include potential encroachments. The visualization 670 includes an initial boundary 657 of the parked car 654A, the adjusted evidence grid portion 662, the adjusted evidence grid portion 664, and adjusted evidence grid portion 668. These extended boundaries ensure that the ego vehicle 672 can navigate safely by planning around these potential dynamic scenarios.

Referring again to FIG. 3, at 328, boundaries are adjusted based on the reference path and speed plan 320, if available. Right and left boundary constraints are determined based on the evidence grid. That is, the right and left boundary constraints are determined (e.g., set) based on the non-drivable points, the identified hazards, the interaction areas, the adjusted static hazards, and other data accumulated in the evidence grid.

Each grid cell on the left and right boundaries can be classified according to classifications including a first, second, and third constraint classification. The first classification indicates that no hazard (e.g., risk) is found within the boundary limit associated with the grid cell. The second classification indicates that only risk from non-drivable points (e.g. curbs, trash cans, or other non-classified objects) is identified. The third classification indicates the presence of risk from identified hazards such as vehicles, pedestrians, cyclists, etc. where additional information (e.g., a hazard type and the object identifier) are associated with the grid cells.

Figure 7:
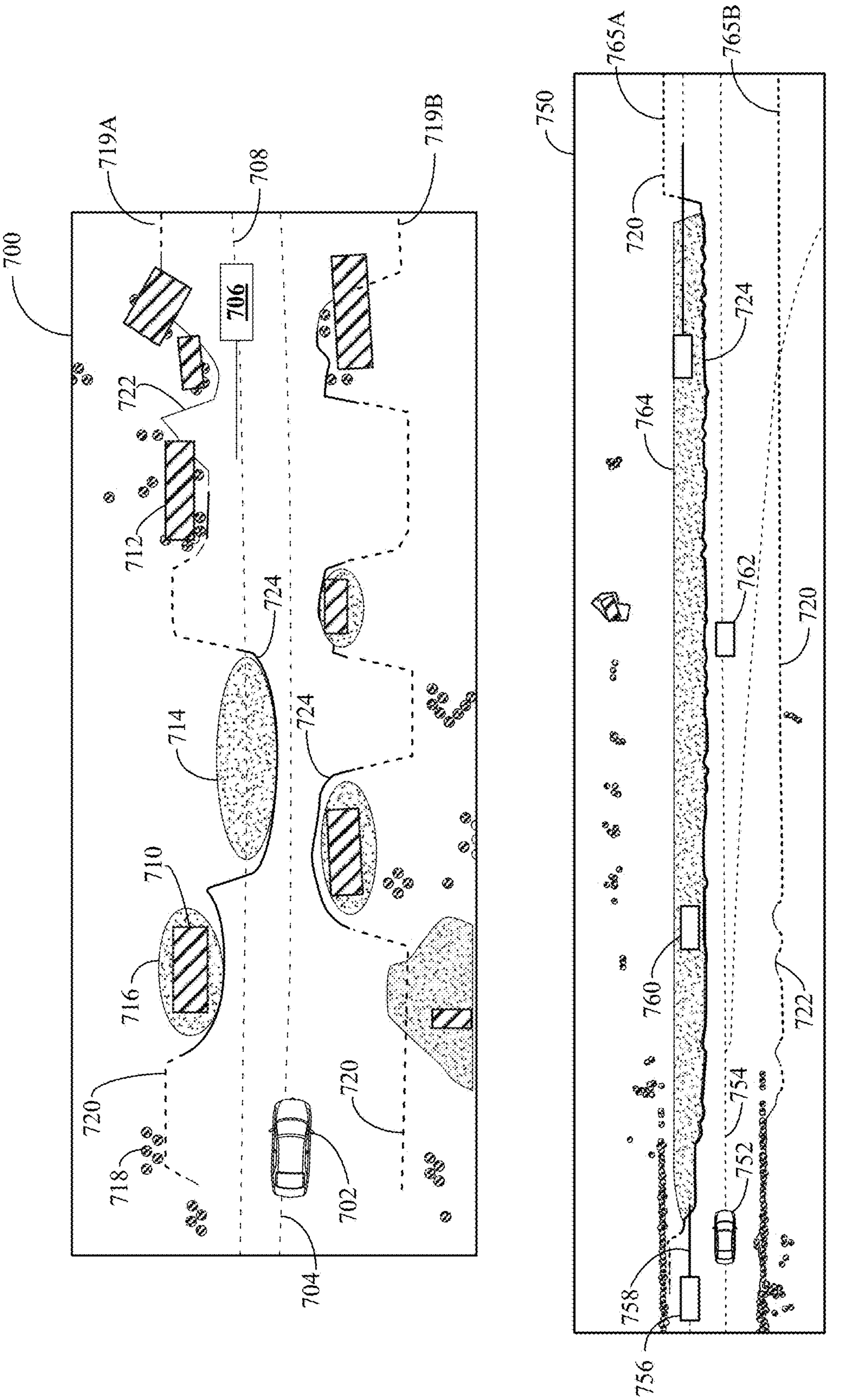
FIG. 7 illustrate examples of visualizations of setting and classifying boundary points based on the evidence grid.

FIG. 7 illustrate examples of visualizations of setting and classifying boundary points based on the evidence grid.

A visualization 700 illustrates a visualization of a scene illustrating an oncoming vehicle hazard, such as that described with respect to or shown in FIGS. 4B-4C, 5A, and 6A. The visualization 700 includes an ego vehicle 702 planned to traverse along a reference path 704, an oncoming vehicle 706 predicted to traverse a path 708, and other identified objects, such as hazards 710 and 712, which may be parked cars. The visualization 700 includes an interaction area 714 between the ego vehicle 702 and the oncoming vehicle 706. The visualization 700 also shows the adjusted boundaries 716 constituting non-drivable grid cell points around the hazard 710 and other non-drivable grid points, such as non-drivable grid points 718.

A first (e.g., left) boundary 719A and a second (e.g., right) boundary 719B are identified and the grid cells associated therewith are classified according to the first, second, or third classifications described above. For example, grid cells painted with a pattern 720 (e.g., dashed line) may be assigned the first classification, grid cells painted with a pattern 722 (e.g., a thin line) may be assigned the second classification, and grid cells painted with a pattern 724 (e.g., a line thicker than that of the pattern 722) may be assigned the third classification.

A visualization 750 illustrates a visualization of a scene illustrating a parallel vehicle hazard, such as that described with respect to or shown in FIG. 6B. The visualization 750 includes an ego vehicle 752 planned to traverse a reference path 754, and a parallel vehicle 756 predicted to traverse a path 758, and other identified vehicles, such as another parallel vehicle 760 and a leading vehicle 762. The visualization 750 includes an interaction area 764 between the ego vehicle 752 and the parallel vehicle 756.

A first (e.g., left) boundary 765A and a second (e.g., right) boundary 765B are identified and the grid cells associated therewith are classified according to the first, second, and third classifications described above. For example, grid cells painted with the pattern 720 may be assigned the first classification, grid cells painted with the pattern 722 may be assigned the second classification, and grid cells painted with the pattern 724 may be assigned the third classification.

Figure 8:
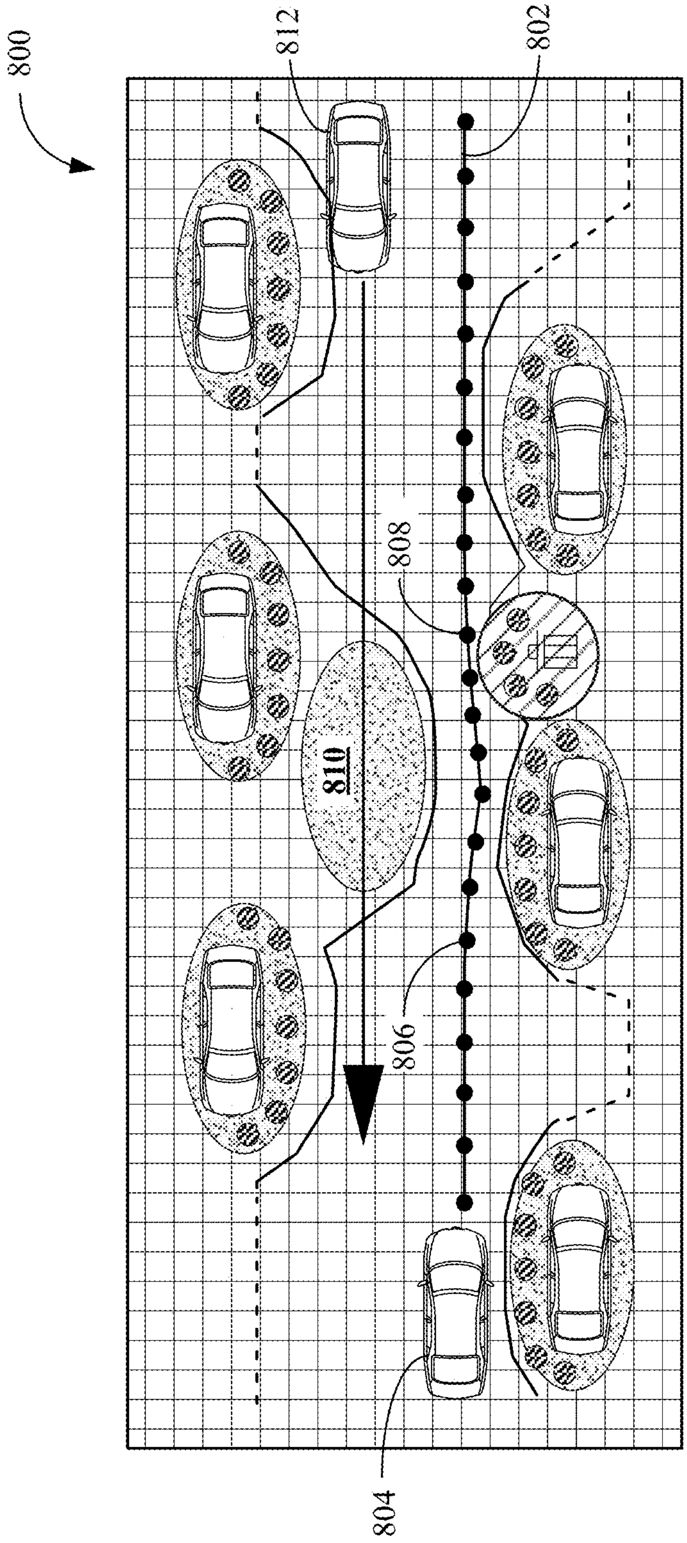
FIG. 8 illustrates an example of identifying a valid path centerline and real-time speed plan for the scene described with respect to the example of FIG. 5.

Referring again to FIG. 3, at 330, a valid path centerline and real-time speed plan through (e.g., based on) the evidence grid is searched (e.g., identified). FIG. 8 illustrates an example 800 of identifying a valid path centerline and real-time speed plan for the scene described with respect to example 500 of FIG. 5. A path 802 (e.g., a short-term or real-time path) illustrates the planned locations (such as locations 806 and 808) of an ego vehicle 804 based on the evidence grid. The real-time speed plan may indicate a reduced speed between the locations 806 and 808 corresponding to the beginning and ending of an interaction area 810 between the ego vehicle 804 and an oncoming vehicle 812.

At 332, the evidence grid can be parsed for useful information. The useful information may be transmitted to different modules of the ego vehicle. To be clearer, a two-step process is described: at 330, a valid path centerline through the evidence grid is searched (e.g., found or identified) and then, at 332, the accumulated hazards near the path can be processed to produce useful information for other processes.

The information may be transmitted in any suitable data format. In an example, the Robot Operating System (ROS) format can be used. ROS implements a publisher and subscriber framework and is an open-source middleware framework commonly used in robotics applications, including autonomous vehicles, to provide a structured communications layer above host operating systems. The useful information may be communicated to one or more modules or processes 334 of the ego vehicle.

For example, the left and right hazard boundary constraints can be provided to a PRM process. The PRM process may be executed as part of a short-term planner process so that risk mitigation using lateral and speed constraints can be performed. To illustrate, once the PRM process receives the hazard boundary constraints associated the scene described with respect to FIG. 8, the mitigation strategy implemented thereby may be to stay to the right of the path and apply heavy deceleration with the plan to pass the oncoming vehicle at a very low speed.

In another example, the estimated area where the ego and another moving vehicle will interact in the future can be parsed and published as a convex hull or rectangular bounding box. This information can be used, for example, by a decision-making process of the ego vehicle to determine whether to stop, pull over, edge, proceed, or take some other action.

In another example, a proposed lane change can be examined within the risk field by parsing the evidence grid and determining whether the neighboring lane is currently occupied or predicted to be occupied by another vehicle. To illustrate, a lane change request can be passed to the risk field process (e.g., the process 300) to verify that the adjacent lane is safe for the ego vehicle to enter. Using the scenario described with respect to FIG. 6B as an example, a request to immediately change to the left lane would be denied due to the accumulation of the parallel vehicle hazard. A lane change later along the path of the ego vehicle would be approved as there is no accumulation of any hazard in the grid cells located further ahead as the adjacent vehicle would have already passed the ego vehicle.

Figure 9:
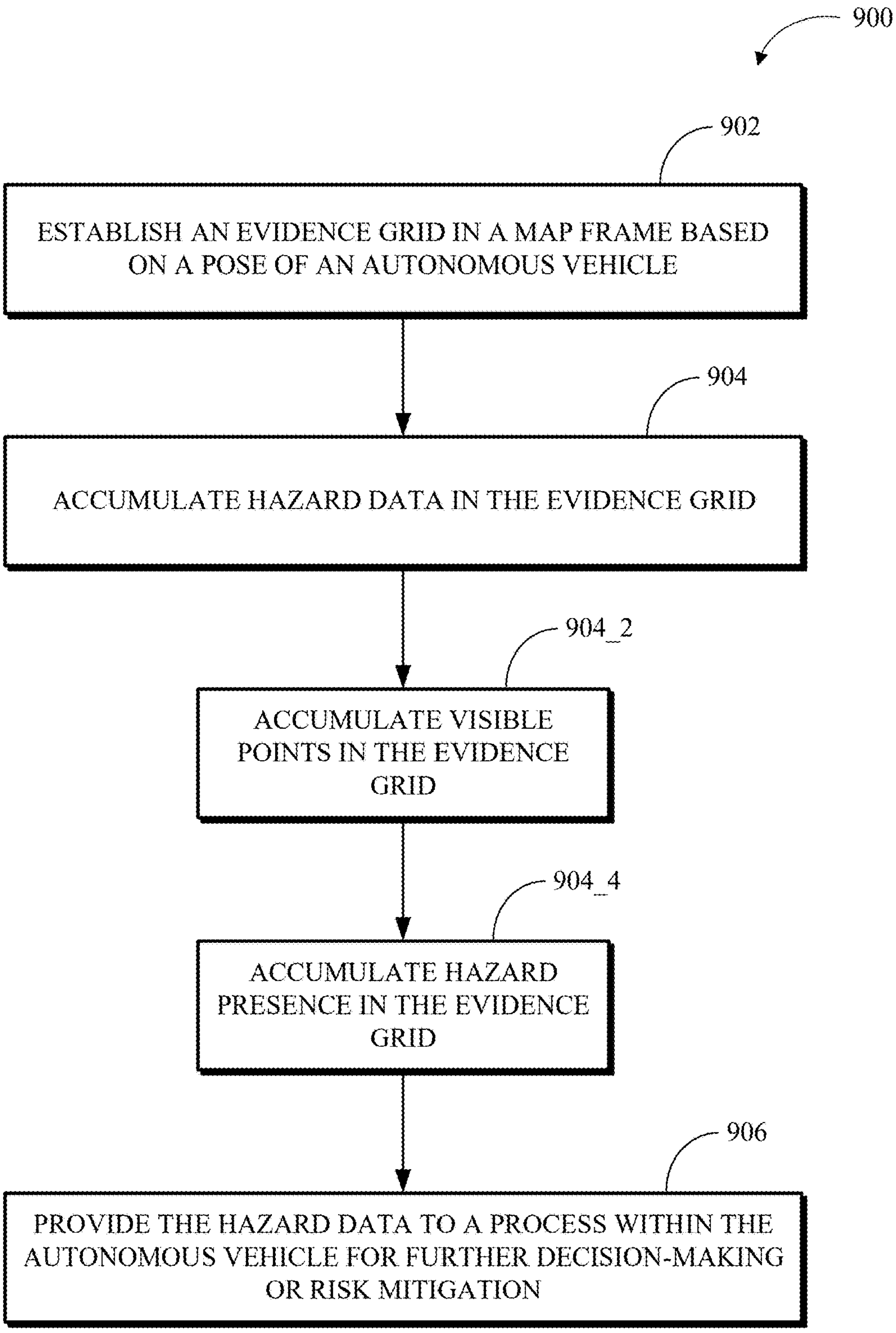
FIG. 9 is a flowchart of an example of a technique for maintaining an evidence grid.

To further describe some implementations in greater detail, reference is next made to examples of techniques which may be performed for or using an evidence grid for vehicle navigation. FIG. 9 is a flowchart of an example of a technique 900 for maintaining an evidence grid. The evidence grid can be divided into a plurality of grid tiles, each containing multiple grid cells. The technique 900 can be executed using computing devices, such as the systems, hardware, and software described with respect to FIGS. 1-8.

At 902, an evidence grid is established in a map frame based on a pose of an autonomous vehicle. The evidence grid represents the surrounding environment of the autonomous vehicle and is updated dynamically as the vehicle moves. The pose of the vehicle, including its position and orientation, is used to accurately place the evidence grid within the map frame.

At 904, hazard data is accumulated in the evidence grid. Accumulating the hazard data includes steps 904_2 and 904_4. At 904_2, visible points are accumulated in the evidence grid. Each visible point is associated with a respective visibility probability, indicating a history of visibility determination associated with each visible point. This visibility probability can be adjusted based on the visibility classification of the point at each time step. At 904_4, hazard presence is accumulated in the evidence grid. Each grid cell associated with the presence of a hazard (e.g., each grid cell determined to include a hazard) is associated with a hazard presence probability indicating a history of hazard presence determinations with respect to the each grid cell. Accumulating the hazard data can also include accumulating non-drivable points in the evidence grid. Each non-drivable point is associated with a respective non-drivable probability indicating a history of non-drivability determination associated with the each non-drivable point.

At 906, the hazard data is provided to a process within the autonomous vehicle for further decision-making or risk mitigation. The accumulated hazard data can be published through shared custom message formats in inter-process communication systems, enabling various systems within the autonomous vehicle to access and utilize the data for improved decision-making and risk mitigation. This allows the vehicle's systems to use the accumulated data to make informed decisions about navigation and safety.

In an example, the technique 900 can include adding to the hazard data an interaction area with respect to a dynamic object. The interaction area can be defined by a series of predicted future time steps of the dynamic object relative to a path or a speed plan of the autonomous vehicle. This involves determining a distance range within which dynamic hazards are considered for accumulation in the evidence grid. The distance range is based on a predefined threshold for the sensor capabilities of the autonomous vehicle.

Data of a hazard's presence, including object identifiers, hazard types, and visibility probabilities, can be stored in association with each of the multiple grid cells within a grid tile.

The technique 900 can also include deleting grid tiles behind the autonomous vehicle and creating new grid tiles ahead of the vehicle as it moves. This dynamic updating of grid tiles ensures that the evidence grid remains current and relevant. Data regarding a hazard can be shared among grid cells occupied by the same hazard. This involves sharing object IDs and other relevant data among cells to maintain consistency and accuracy in hazard representation. Hazards can be classified into static and dynamic hazards. Static hazards are fixed obstacles like curbs and trash cans, while dynamic hazards include moving objects such as vehicles and pedestrians. When a reference path and speed plan of the autonomous vehicle are available, moving vehicles can be further sub-classified into categories like parallel vehicles, oncoming vehicles, leading vehicles, or follower vehicles.

Herein, the terminology "passenger", "driver", or "operator" may be used interchangeably. Also, the terminology "brake" or "decelerate" may be used interchangeably. As used herein, the terminology "processor", "computer", or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special-purpose processor or circuitry that may include specialized hardware for carrying out any of the methods, algorithms, aspects, or combinations thereof, as described herein. In some embodiments, portions of the instructions may be distributed across multiple processors on a single device, or on multiple devices, which may communicate directly or across a network, such as a local area network, a wide area network, the Internet, or a combination thereof.

As used herein, the term "memory subsystem" includes one or more memories, where each memory may be a computer-readable medium. A memory subsystem may encompass memory hardware units (e.g., a hard drive or a disk) that store data or instructions in software form. Alternatively, or in addition, the memory subsystem may include data or instructions that are hard-wired into processing circuitry.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:

establishing an evidence grid in a map frame based on a pose of an autonomous vehicle, wherein the evidence grid is divided into a plurality of grid tiles, each grid tile containing multiple grid cells;

accumulating hazard data in the evidence grid by:

accumulating visible grid cells in the evidence grid, wherein each visible grid cell is associated with a respective visibility probability indicating a history of visibility determinations associated with the visible grid cell; and accumulating hazard presence in the evidence grid, wherein each grid cell associated with a presence of a hazard is associated with a hazard presence probability indicating a history of hazard presence determinations with respect to the each grid cell;

providing the hazard data to a process within the autonomous vehicle for further decision-making or risk mitigation;

classifying hazards into static hazards and dynamic hazards; and sub-classifying, based on a reference path of the autonomous vehicle, a moving vehicle into at least one of a parallel vehicle, an oncoming vehicle, a leading vehicle, or a follower vehicle.

2. The method of claim 1, wherein accumulating the hazard data in the evidence grid further comprises:

accumulating non-drivable points in the evidence grid, wherein each non-drivable point is associated with a respective non-drivable probability indicating a history of non-drivability determination associated with the each non-drivable point.

3. The method of claim 1, wherein accumulating the hazard data in the evidence grid comprises:

adding to the hazard data an interaction area with respect to a dynamic object, wherein the interaction area is defined by a series of predicted future time steps of the dynamic object relative to a path or a speed plan of the autonomous vehicle.

4. The method of claim 1, wherein the method further comprising:

storing, in association with each of the multiple grid cells within a grid tile, data of a hazard including object identifiers, hazard types, and visibility probabilities.

5. The method of claim 1, further comprising:

deleting grid tiles behind the autonomous vehicle and creating new grid tiles ahead of the autonomous vehicle as the autonomous vehicle moves.

6. The method of claim 1, wherein accumulating the hazard data in the evidence grid comprises:

sharing data among grid cells occupied by a same hazard.

7. The method of claim 1, further comprising:

publishing the accumulated hazard data through shared custom message formats in inter-process communication systems.

8. The method of claim 1, wherein the visibility probability tracks whether the visible grid cell was within a sensor field of view of the autonomous vehicle during each determination, independent of whether a hazard is present.

9. The method of claim 1, wherein accumulating the hazard data in the evidence grid further comprises:

increasing the hazard presence probability for a given grid cell more rapidly when sensor data used to make hazard presence determinations for the given grid cell has a higher confidence level, and increasing the hazard presence probability for the given grid cell more slowly when the sensor data has a lower confidence level.

10. A vehicle, comprising:

a memory; and a processor configured to execute instructions stored in the memory to:

establish an evidence grid in a map frame based on a pose of an autonomous vehicle, wherein the evidence grid is divided into a plurality of grid tiles, each grid tile containing multiple grid cells;

accumulate hazard data in the evidence grid, wherein to accumulate the hazard data in the evidence grid comprise to:

accumulate visible grid cells in the evidence grid, wherein each visible grid cell is associated with a respective visibility probability indicating a history of visibility determinations associated with the visible grid cell; and accumulate hazard presence in the evidence grid, wherein each grid cell associated with a presence of a hazard is associated with a hazard presence probability indicating a history of hazard presence determinations with respect to the each grid cells;

provide the hazard data to a process within the autonomous vehicle for further decision-making or risk mitigation;

classify hazards into static hazards and dynamic hazards; and sub-classify, based on a reference path of the autonomous vehicle, a moving vehicle into at least one of a parallel vehicle, an oncoming vehicle, a leading vehicle, or a follower vehicle.

11. The vehicle of claim 10, wherein to accumulate the hazard data in the evidence grid further comprises to:

accumulate non-drivable points in the evidence grid, wherein each non-drivable point is associated with a respective non-drivable probability indicating a history of non-drivability determination associated with the each non-drivable point.

12. The vehicle of claim 10, wherein to accumulate the hazard data in the evidence grid comprises to:

add to the hazard data an interaction area with respect to a dynamic object, wherein the interaction area is defined by a series of predicted future time steps of the dynamic object relative to a path or a speed plan of the autonomous vehicle.

13. The vehicle of claim 10, wherein the processor is further configured to execute instructions stored in the memory to:

store, in association with each of the multiple grid cells within a grid tile, data of a hazard including object identifiers, hazard types, and visibility probabilities.

14. The vehicle of claim 10, wherein the processor is further configured to execute instructions stored in the memory to:

delete grid tiles behind the autonomous vehicle and creating new grid tiles ahead of the autonomous vehicle as the autonomous vehicle moves.

15. The vehicle of claim 10, wherein to accumulate the hazard data in the evidence grid comprises to:

share data among grid cells occupied by a same hazard.

16. The vehicle of claim 10, wherein the visibility probability tracks whether the visible grid cell was within a sensor field of view of the autonomous vehicle during each determination, independent of whether a hazard is present.

17. A non-transitory computer-readable medium storing instructions operable to cause one or more processors to perform operations comprising:

establishing an evidence grid in a map frame based on a pose of an autonomous vehicle, wherein the evidence grid is divided into a plurality of grid tiles, each grid tile containing multiple grid cells;

accumulating hazard data in the evidence grid by:

accumulating visible grid cells in the evidence grid, wherein each visible grid cell is associated with a respective visibility probability indicating a history of visibility determinations associated with the visible grid cell; and accumulating hazard presence in the evidence grid, wherein each grid cell associated with a presence of a hazard is associated with a hazard presence probability indicating a history of hazard presence determinations with respect to the each grid cell;

providing the hazard data to a process within the autonomous vehicle for further decision-making or risk mitigation;

classifying hazards into static hazards and dynamic hazards; and sub-classifying, based on a reference path of the autonomous vehicle, a moving vehicle into at least one of a parallel vehicle, an oncoming vehicle, a leading vehicle, or a follower vehicle.

18. The non-transitory computer-readable medium of claim 17, wherein accumulating the hazard data in the evidence grid further comprises:

accumulating non-drivable points in the evidence grid, wherein each non-drivable point is associated with a respective non-drivable probability indicating a history of non-drivability determination associated with the each non-drivable point.

19. The non-transitory computer-readable medium of claim 17, wherein accumulating the hazard data in the evidence grid comprises:

adding to the hazard data an interaction area with respect to a dynamic object, wherein the interaction area is defined by a series of predicted future time steps of the dynamic object relative to a path or a speed plan of the autonomous vehicle.

20. The non-transitory computer-readable medium of claim 17, wherein the visibility probability tracks whether the visible grid cell was within a sensor field of view of the autonomous vehicle during each determination, independent of whether a hazard is present.

* * * * *